(12) United States Patent
Gorlicka et al.

(10) Patent No.: US 12,721,477 B2
(45) Date of Patent: Sep. 1, 2026

(54) PELLET GRILLS INCLUDING HEAT DIFFUSERS CONFIGURED FOR OPTIMUM HEAT DISTRIBUTION

(71) Applicant: Weber-Stephen Products LLC, Palatine, IL (US)

(72) Inventors: Natalia Gorlicka, Itasca, IL (US); Ethan Albrecht, Evanston, IL (US); Eric G. Griswold, Cary, IL (US)

( * ) Notice: Subject to any disclaimer, the term of this patent is extended or adjusted under 35 U.S.C. 154(b) by 411 days.

(21) Appl. No.: 18/391,506

(22) Filed: Dec. 20, 2023

(65) Prior Publication Data

US 2025/0204722 A1 Jun. 26, 2025

(51) Int. Cl.
*A47J 37/07* (2006.01)

(52) U.S. Cl.
CPC ................................ *A47J 37/0786* (2013.01)

(58) Field of Classification Search
CPC ................ A47J 37/0704; A47J 37/0786; A47J 37/0754; F23J 13/08; F23J 2900/13005; F23J 11/02; F23L 17/02
USPC ........................................................ 454/34, 4
See application file for complete search history.

(56) References Cited

U.S. PATENT DOCUMENTS 2,894,448 A 7/1959 Elmer et al.
3,421,429 A * 1/1969 Stone ...................... F23L 17/02 454/34
4,823,684 A 4/1989 Traeger et al.
4,886,044 A 12/1989 Best
5,121,676 A 6/1992 Jurgens
5,251,607 A 10/1993 Traeger et al.
5,313,877 A 5/1994 Holland
5,429,110 A 7/1995 Burke et al.
5,617,778 A 4/1997 Schroeter et al.
5,765,469 A 6/1998 Schlosser et al.
6,213,006 B1 4/2001 Reardon et al.
6,223,737 B1 5/2001 Buckner
6,250,174 B1 6/2001 Terada et al.
6,520,174 B1 2/2003 Scigliuolo
6,810,792 B1 11/2004 Knight
7,530,351 B2 5/2009 Leverty
7,637,258 B2 12/2009 Cosgrove
(Continued)

FOREIGN PATENT DOCUMENTS

EP 3281571 A1 2/2018
WO WO-2004004527 A1 * 1/2004 .......... A47J 37/0759

OTHER PUBLICATIONS

International Searching Authority, "International Search Report and Written Opinion," issued in connection with International Patent Application No. PCT/US2024/054626, mailed on Feb. 28, 2025, 13 pages.

*Primary Examiner* — Ngoc T Nguyen
(74) *Attorney, Agent, or Firm* — Avantech Law, LLP

(57) ABSTRACT

Pellet grills including heat diffusers configured for optimum heat distribution are disclosed. An example heat diffuser includes a front wall, a rear wall, a top wall, a bottom wall, a right sidewall, a left sidewall, a first intake opening, a first exhaust opening, and a second exhaust opening. The bottom wall includes the first intake opening. The first exhaust opening is located along the right sidewall between the front wall and the rear wall and between the top wall and the right sidewall. The second exhaust opening is located along the left sidewall between the front wall and the rear wall and between the top wall and the left sidewall.

20 Claims, 24 Drawing Sheets

(56) References Cited

U.S. PATENT DOCUMENTS 7,665,406 B2 2/2010 Krumrei
7,900,553 B1 3/2011 Maurin
7,958,884 B2 6/2011 Pieti
8,281,709 B2 10/2012 Sacherman et al.
8,752,479 B2 6/2014 Sacherman et al.
8,794,130 B2 8/2014 Ikeda
8,875,622 B2 11/2014 Chung
9,138,099 B2 9/2015 Dhuper et al.
9,635,978 B2 5/2017 Measom et al.
9,669,500 B2 6/2017 Nadal
9,814,354 B2 11/2017 McAdams et al.
9,955,818 B2 5/2018 Nadal
D825,988 S 8/2018 Wang et al.
10,070,754 B2 9/2018 Schlosser et al.
10,070,755 B2 9/2018 Schlosser et al.
10,105,007 B2 10/2018 Colston et al.
10,330,322 B2 6/2019 Measom et al.
10,426,295 B2 10/2019 McAdams et al.
10,455,979 B2 10/2019 Colston et al.
10,624,495 B2 4/2020 Kim et al.
10,694,892 B2 6/2020 Colston
10,729,283 B2 8/2020 McAdams et al.
10,869,576 B2 12/2020 Yaghotian et al.
10,874,251 B2 12/2020 Ahmed
10,888,194 B1 1/2021 Hammack
10,912,413 B2 2/2021 Walters et al.
11,022,316 B2 6/2021 Walters et al.
11,064,837 B2 7/2021 Yang et al.
11,067,284 B2 7/2021 Measom et al.
11,166,590 B2 11/2021 Zheng
11,172,688 B2 11/2021 Powell et al.
11,181,276 B2 11/2021 Colston et al.
11,206,948 B2 12/2021 Measom et al.
11,350,791 B2 6/2022 Colston et al.
11,435,074 B2 9/2022 Rahmani et al.
11,445,857 B2 9/2022 James et al.
11,497,349 B2 11/2022 Meadows et al.
11,739,938 B2 8/2023 Donnelly et al.
11,754,290 B2 9/2023 Measom et al.
2004/0226550 A1 11/2004 Hutton et al.
2005/0051148 A1 3/2005 Sung et al.
2006/0112949 A1 6/2006 Ducate et al.
2007/0131216 A1 6/2007 Le Breis
2007/0215021 A1 9/2007 Krumrei
2008/0141869 A1 6/2008 Ikeda
2008/0196708 A1 8/2008 Lee
2010/0192936 A1 8/2010 Gokturk
2012/0266856 A1 10/2012 Zelek et al.
2013/0174834 A1 7/2013 Measom et al.
2013/0298894 A1 11/2013 Kleinsasser
2014/0326232 A1 11/2014 Traeger
2015/0282668 A1 10/2015 Zhu et al.
2017/0099989 A1 4/2017 Feng
2017/0102149 A1 4/2017 Nadal
2017/0164783 A1 6/2017 Sauerwein et al.
2017/0198917 A1 7/2017 Gillespie et al.
2017/0251875 A1 9/2017 Robinson
2018/0028018 A1 2/2018 Barnett et al.
2018/0296031 A1 10/2018 Terrell, Jr. et al.
2019/0274479 A1 9/2019 Chung
2020/0093145 A1 3/2020 Powell et al.
2020/0240643 A1* 7/2020 Donnelly ............ A47J 37/0704
2021/0068586 A1 3/2021 Yaghotian et al.
2021/0196078 A1 7/2021 Colston et al.
2022/0279966 A1 9/2022 VanDyke et al.
2022/0279967 A1 9/2022 VanDyke et al.
2022/0279970 A1 9/2022 Vandyke et al.
2022/0287504 A1 9/2022 Simon et al.
2022/0412549 A1 12/2022 Rahmani et al.
2023/0073460 A1 3/2023 Bennett et al.
2023/0358408 A1 11/2023 Donnelly et al.

* cited by examiner 100
108
104
114
118
122
112
106
102
120
110
116

100
408
402
108
404
114
118
122
112
104
102
120
406
110
116
410

100
402
202
210
208
112
102
108
106
114
502
120
104
118

SECTION A-A

B
108
402

112
802
302
802
302
802
302
106
802
302
802
302
104
102
100
116
110
B 1500
1508
1504
1506
1602
1806
1808
1516
1510
1502
1702
SECTION C-C 1604
402
108
112
100
904
1002
210
202
1802
902
216
1004
1402
106
212
1002
102
1514
1804
1100
1108
116
110

SECTION E-E

PELLET GRILLS INCLUDING HEAT DIFFUSERS CONFIGURED FOR OPTIMUM HEAT DISTRIBUTION

FIELD OF THE DISCLOSURE

This disclosure relates generally to pellet grills and, more specifically, to pellet grills including heat diffusers configured for optimum heat distribution.

BACKGROUND

Pellet grills are electronically-controlled cooking devices that are configured to cook (e.g., smoke, grill, bake, roast, broil, sear, and/or otherwise heat) food items located within (e.g., placed on one or more cooking grate(s) positioned within) a cooking chamber of the pellet grill. The controllable electronic components of the pellet grill can be powered via AC power (e.g., supplied to the pellet grill via household electricity or wall power) or DC power (e.g., supplied via an on-board or connected battery and/or DC power supply).

Conventional pellet grills store a volume of combustible pellet fuel (e.g., wood-based pellets) in a hopper that is mounted and/or coupled to the pellet grill. A motor-driven auger in communication with an exit opening of the hopper feeds and/or supplies the pellet fuel from the hopper into a burn pot of the pellet grill in a controlled and/or automated manner. The speed, rate, and/or duty cycle of the auger is typically based on a user-selected temperature (e.g., a temperature setpoint) that is established and/or desired for the cooking chamber of the pellet grill. Pellet fuel that is deposited in the burn pot can initially be ignited via an ignitor (e.g., a DC-powered glow plug) of the pellet grill.

Combustion and/or burning of the pellet fuel within the burn pot produces, generates, and/or outputs heat which is subsequently distributed throughout the cooking chamber in a manner that causes the food items located within the cooking chamber to gradually become cooked. A motor-driven fan is typically implemented to assist with combusting the pellet fuel, and/or to assist with distributing and/or circulating heat (e.g., as may be produced by the combusted pellet fuel) throughout the cooking chamber.

Many conventional pellet grills further include a grease deflector disposed in the cooking chamber, with the grease deflector being located below the cooking grate and above the burn pot of the pellet grill. In some known implementations, the grease deflector of the pellet grill is configured as a sheet or a pan that collects grease drippings from one or more item(s) of food being cooked on the cooking grate of the pellet grill, and thereafter directs the received grease drippings to a particular region and/or a particular area (e.g., a right side or a left side) of the cooking chamber of the pellet grill that is commonly located away from the burn pot of the pellet grill. In some such known implementations, the grease deflector of the pellet grill also functions as a heat diffuser that diffuses and/or distributes heat generated by the burn pot of the pellet grill to various regions and/or areas of the cooking chamber of the pellet grill.

Figure 1:
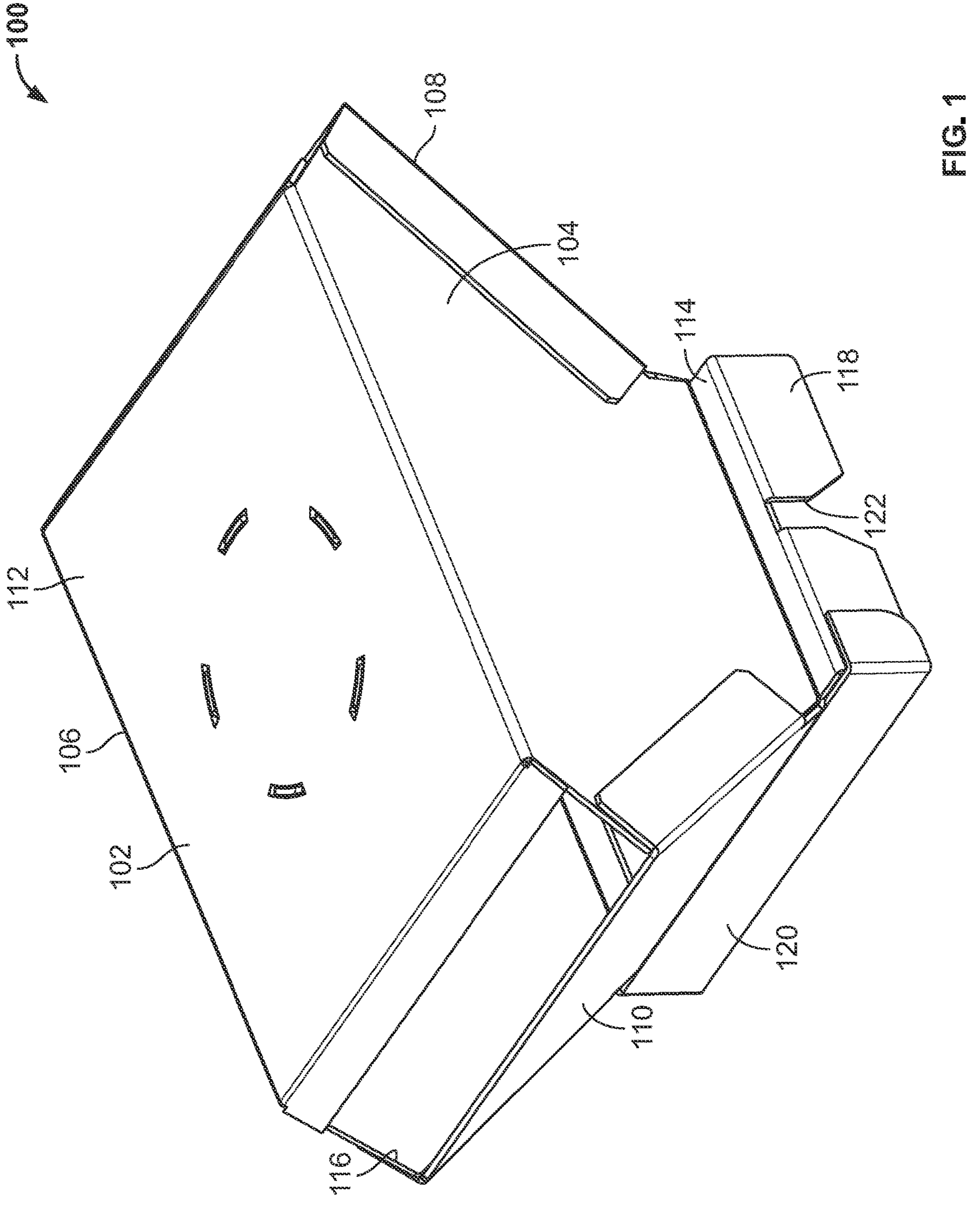
FIG. 1 is a first perspective view of an example heat diffuser constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, pellet grills conventionally include (1) a cooking chamber, (2) a cooking grate disposed in the cooking chamber, (3) a grease deflector disposed in the cooking chamber below the cooking grate, and (4) a burn pot disposed in the cooking chamber below the grease deflector. In some known implementations, the grease deflector of the pellet grill is configured as a sheet or a pan that collects grease drippings from one or more item(s) of food being cooked on the cooking grate of the pellet grill, and thereafter directs the received grease drippings to a particular region and/or a particular area (e.g., a right side or a left side) of the cooking chamber of the pellet grill that is commonly located away from the burn pot of the pellet grill. In some such known implementations, the grease deflector of the pellet grill also functions as a heat diffuser that diffuses and/or distributes heat generated by the burn pot of the pellet grill to various regions and/or areas of the cooking chamber of the pellet grill.

In many instances, the location (e.g., the centricity) of the burn pot within the cooking chamber of the pellet grill and/or the intensity of the heat being emitted from the burn pot of the pellet grill results in the formation of significant heat distribution and/or temperature variations (e.g., the presence of cold spots and/or hot spots) across the cooking grate of the pellet grill. In addition to making the cooking process highly inefficient, significant heat distribution and/or temperature variations can also effectively render portions of the cooking grate of the pellet grill unusable for their intended purpose, thereby resulting in a less than optimum user experience for the consumer.

Unlike the known pellet grills described above, example pellet grills disclosed herein include heat diffusers configured for optimum heat distribution. In some disclosed examples, the heat diffuser is configured to be positioned above, over, and/or on a burn pot of a pellet grill (e.g., above, over, and/or on a housing of an engine assembly that contains such a burn pot) such that the heat diffuser receives a flow of heat generated by and emitted from a combustion chamber of the burn pot. In some disclosed examples, the heat diffuser includes an outer frame that defines an outer chamber, and an inner frame that defines an inner chamber. In some disclosed examples, the combustion chamber of the burn pot, the inner chamber of the inner frame of the heat diffuser, and the outer chamber of the outer frame of the heat diffuser are respectively located within a cooking chamber of the pellet grill, with the combustion chamber of the burn pot being positioned directly below the inner chamber of the inner frame of the heat diffuser, and with the inner chamber of the inner frame of the heat diffuser being located within (e.g., surrounded by) the outer chamber of the outer frame of the heat diffuser. The inner chamber of the inner frame of the heat diffuser is in fluid communication with the combustion chamber of the burn pot via an open upper end of the burn pot and one or more intake opening(s) formed in a lower end of the inner frame and/or formed in a bottom wall of the outer frame of the heat diffuser. The outer chamber of the outer frame of the heat diffuser is in fluid communication with the inner chamber of the inner frame of the heat diffuser via a plurality of optimized heat distribution openings formed in the inner frame. The cooking chamber of the pellet grill is in fluid communication with the outer chamber of the outer frame of the heat diffuser via a plurality of optimized exhaust openings formed in the outer frame.

The aforementioned configuration of the heat diffuser provides a pressurized heat diffusion system that causes heat generated within the combustion chamber of the burn pot to flow upward from the combustion chamber of the burn pot into the inner chamber of the inner frame of the heat diffuser (e.g., via the open upper end of the burn pot and the intake opening(s) formed in the inner frame and/or the outer frame), to flow from the inner chamber of the inner frame of the heat diffuser into the outer chamber of the outer frame of the heat diffuser in a directed and/or controlled manner (e.g., via the plurality of optimized heat distribution openings formed in the inner frame), and to flow from the outer chamber of the outer frame of the heat diffuser into the cooking chamber of the pellet grill in a directed and/or controlled manner (e.g., via the plurality of optimized exhaust openings formed in the outer frame). The inner frame, the inner chamber, the heat distribution openings, the outer frame, the outer chamber, and the exhaust openings of the heat diffuser are advantageously configured to distribute the flow of heat from the burn pot of the pellet grill into the cooking chamber of the pellet grill in a manner that produces an even and/or a generally uniform temperature across the entire surface of a cooking grate of the pellet grill, thereby reducing (e.g., eliminating) the cold spots and/or hot spots that are commonly found in known pellet grills. The disclosed heat diffuser accordingly improves the efficiency of the cooking process, and also ensures that the full surface area of the cooking grate is usable for its intended purpose, thereby resulting in an improved and/or optimum user experience for the consumer.

The inner frame, the inner chamber, the heat distribution openings, the outer frame, the outer chamber, and the exhaust openings of the heat diffuser are also advantageously configured to reduce the presence of ash in upper portions of the cooking chamber of the pellet grill, including the portion(s) and/or level(s) of the cooking chamber at which one or more cooking grate(s) of the pellet grill is/are disposed. In some disclosed examples, the inner frame and/or the inner chamber of the heat diffuser is/are advantageously configured as a cylindrical tunnel that chokes the aforementioned flow of heat as said flow of heat progresses from the combustion chamber of the burn pot, through the inner chamber of the inner frame of the heat diffuser, and into the outer chamber of the outer frame of the heat diffuser. In addition to facilitating subsequent directional control over the flow of heat, the choking of the flow of heat also causes ash that is carried by and/or along with the flow of heat to generally be retained in the combustion chamber of the burn pot, in the inner chamber of the inner frame of the heat diffuser, and/or in the outer chamber of the outer frame of the heat diffuser. Ash that manages to escape all three of the aforementioned chambers of the burn pot and the heat diffuser is advantageously directed by the optimized exhaust openings of the outer frame of the heat diffuser to an underside of a grease deflector of the pellet grill located above the heat diffuser and below the cooking grate(s) of the pellet grill, thereby further reducing the possibility of ash migrating to the portion(s) and/or level(s) of the cooking chamber at which the cooking grate(s) of the pellet grill is/are disposed.

The above-identified features as well as other advantageous features of example pellet grills disclosed herein including heat diffusers configured for optimum heat distribution are further described below in connection with the figures of the application.

As used herein, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 2:
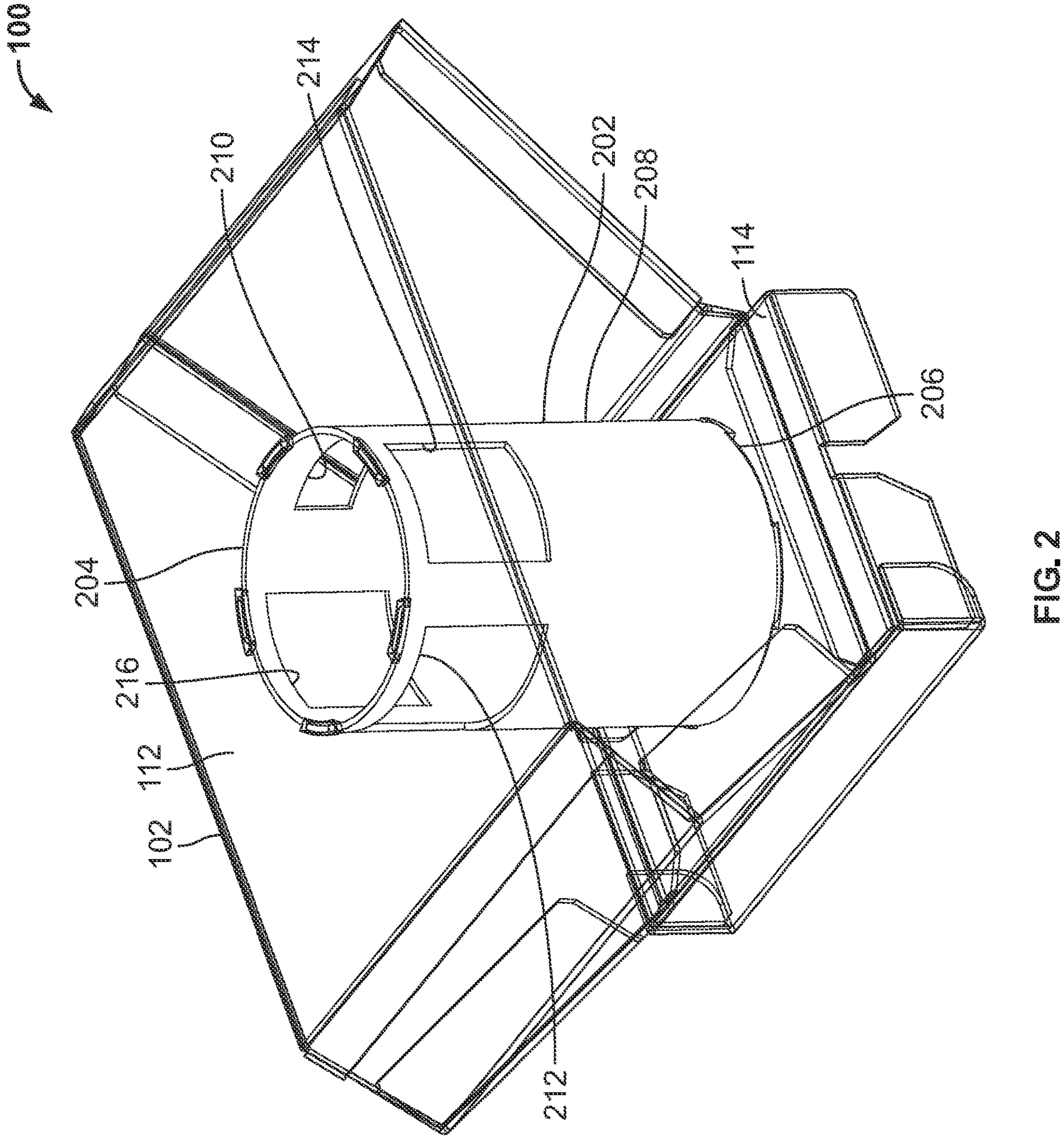
FIG. 2 is a second perspective view of the heat diffuser of FIG. 1, with an example outer frame of the heat diffuser shown in phantom to enable viewing of an example inner frame of the heat diffuser.
Figure 3:
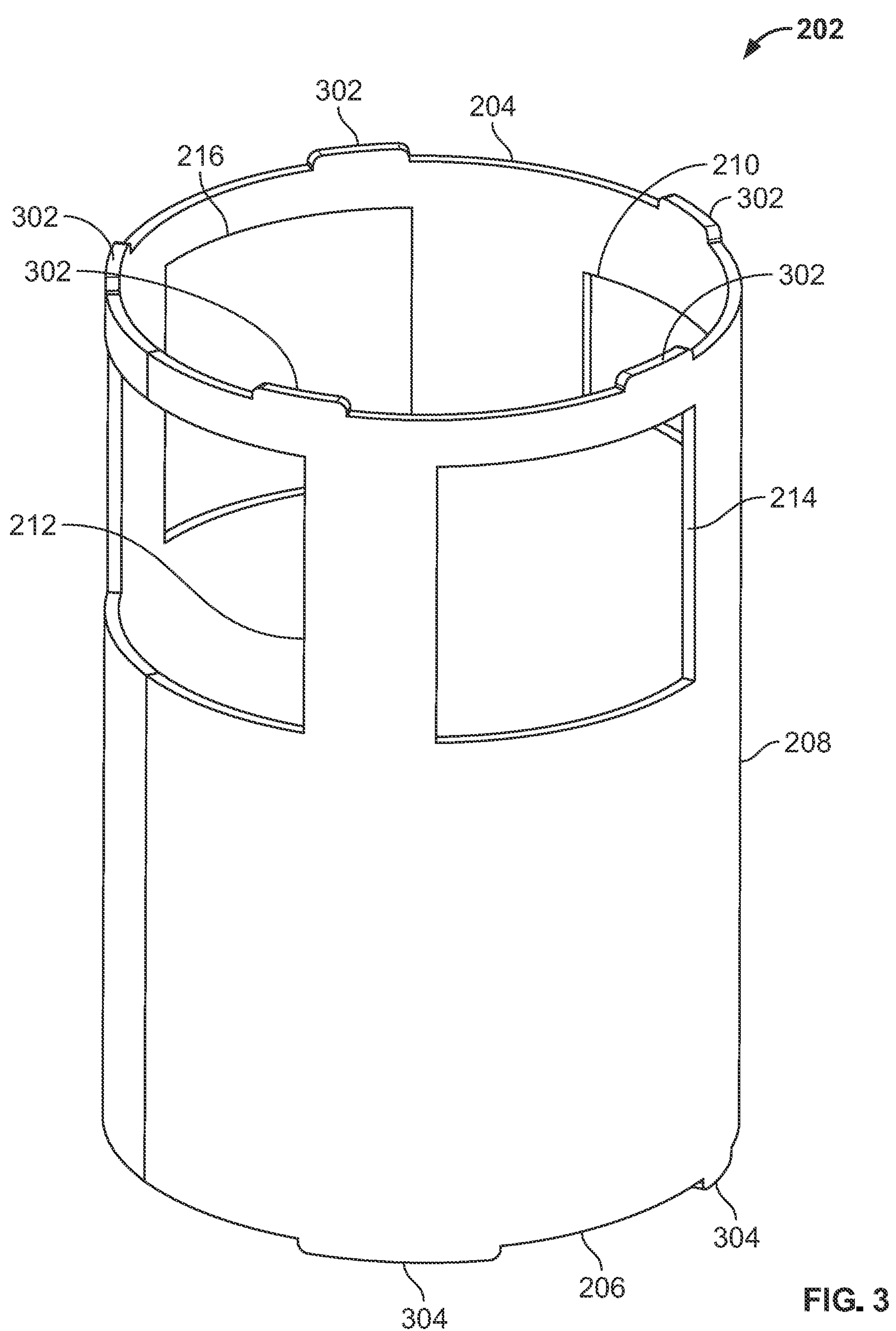
FIG. 3 is a perspective view of the inner frame of the heat diffuser of FIGS. 1 and 2 shown in isolation.
Figure 4:
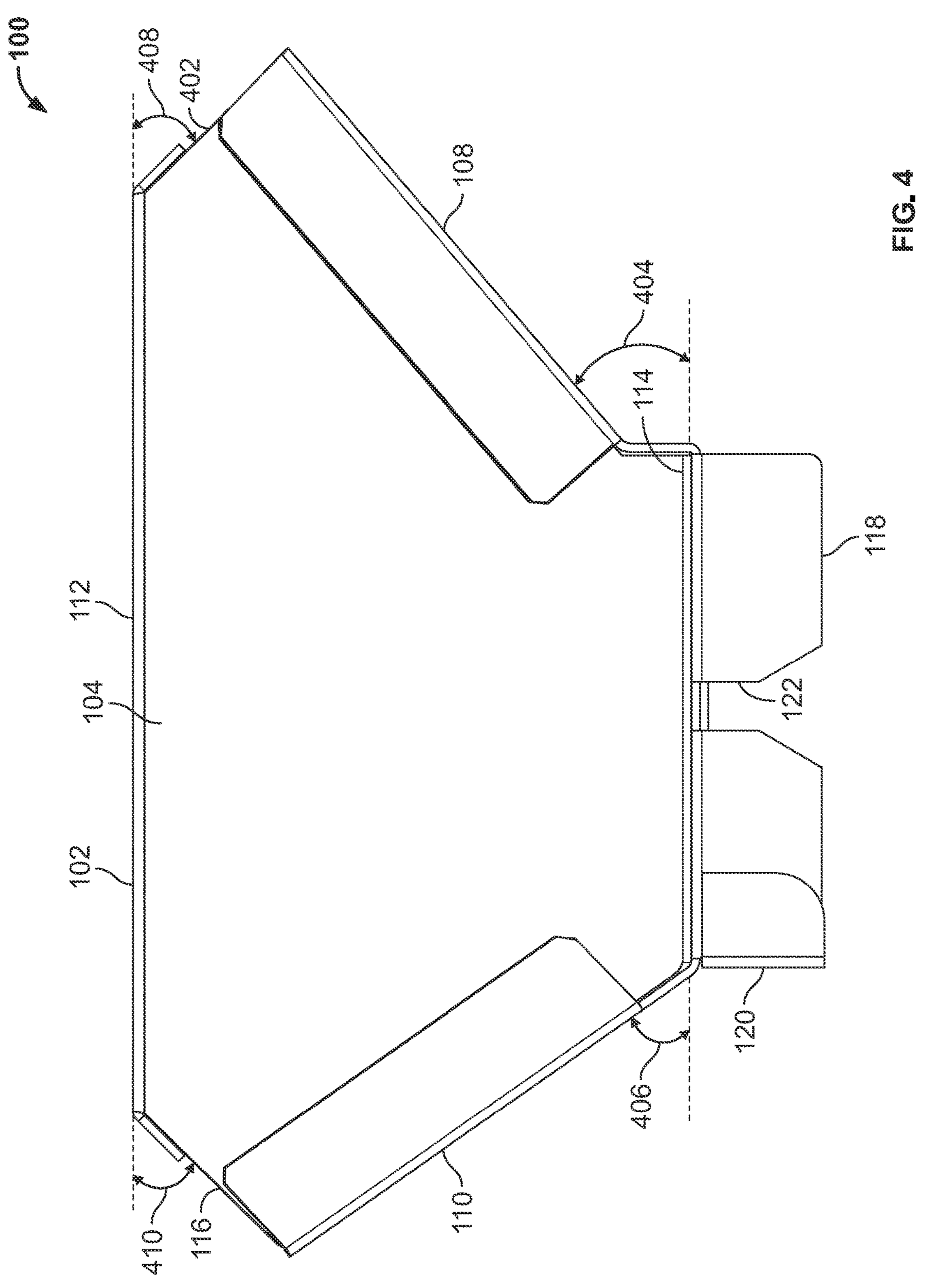
FIG. 4 is a front view of the heat diffuser of FIGS. 1-3.
Figure 5:
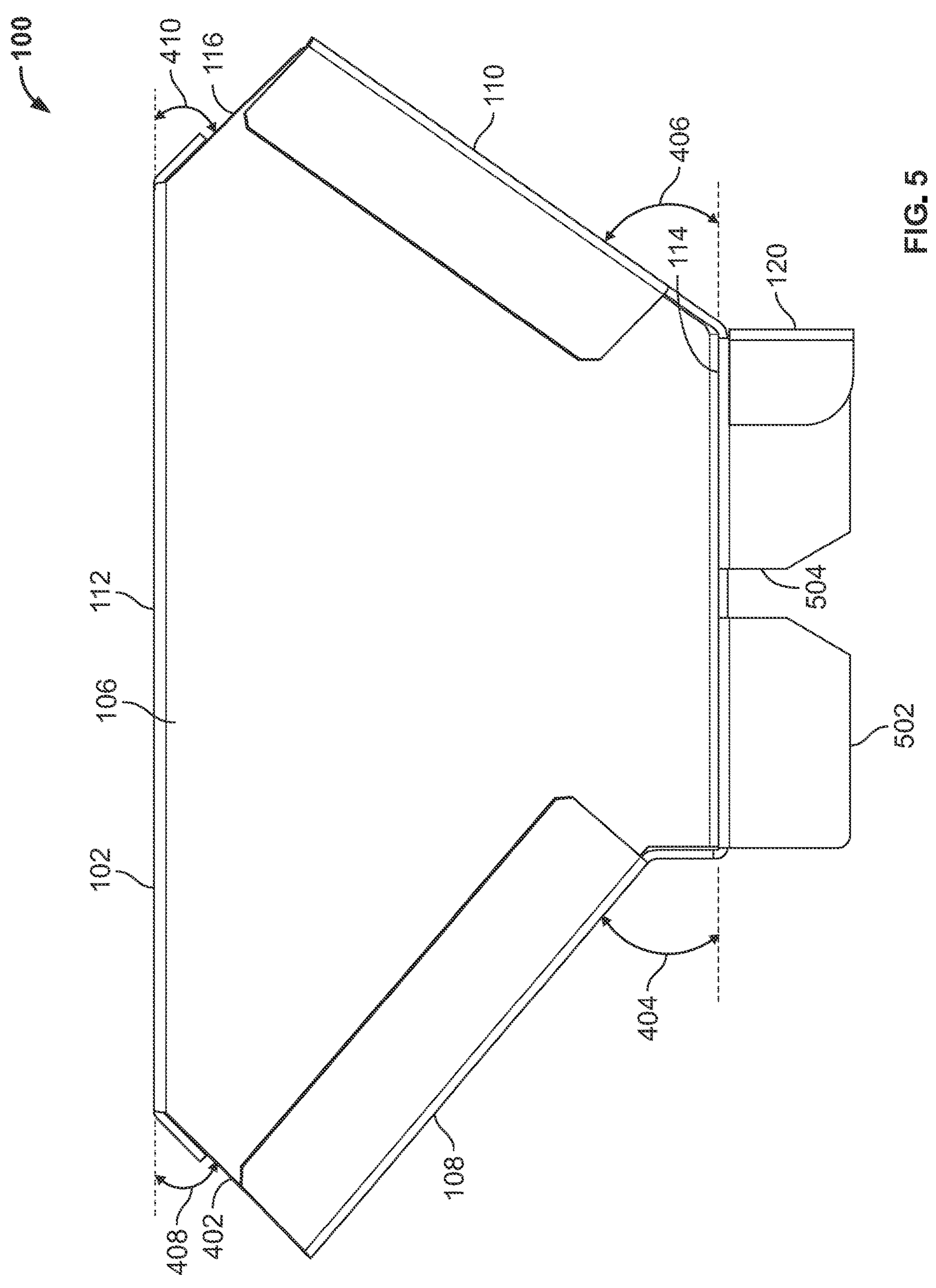
FIG. 5 is a rear view of the heat diffuser of FIGS. 1-4.
Figure 6:
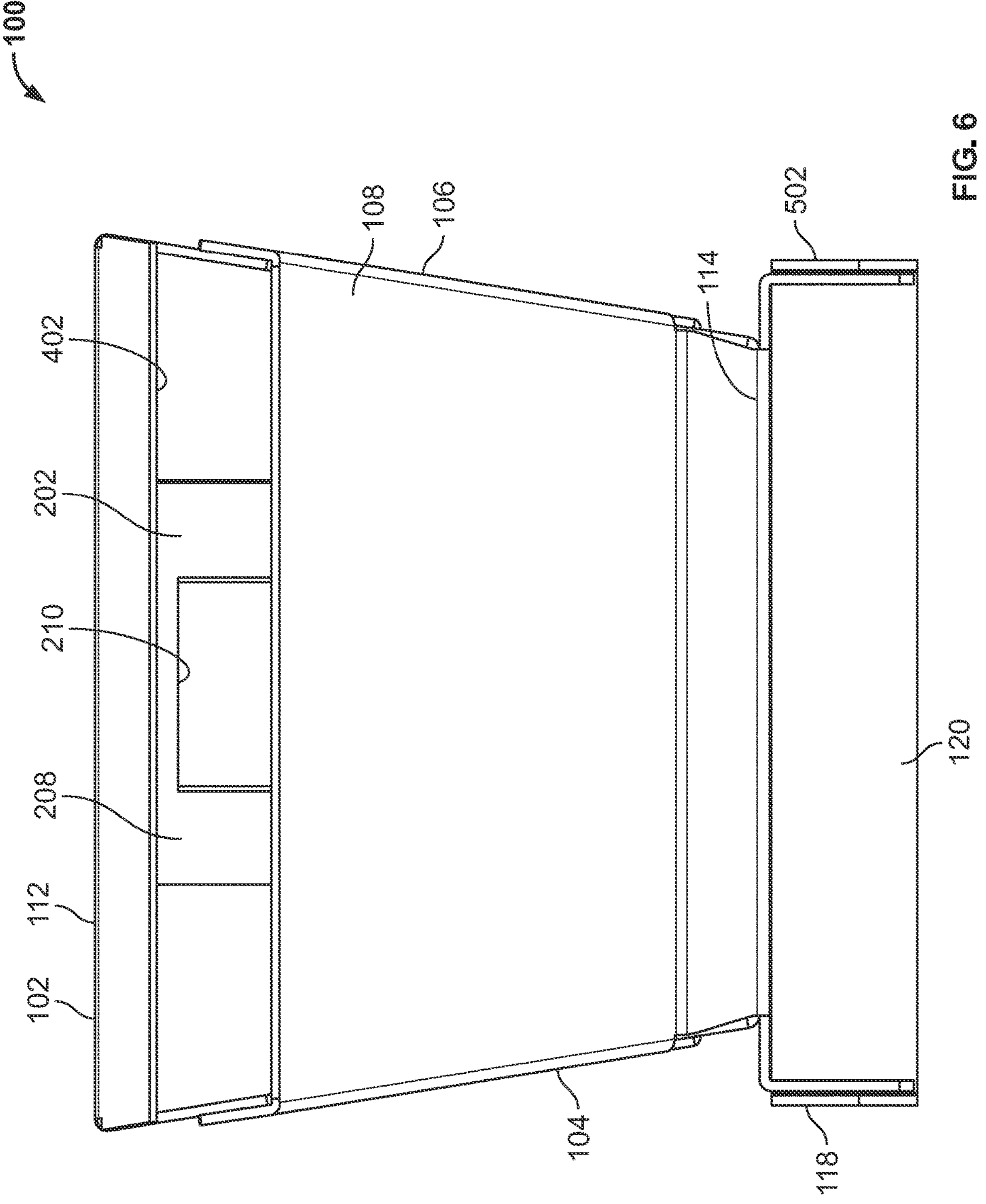
FIG. 6 is a right side view of the heat diffuser of FIGS. 1-5.
Figure 7:
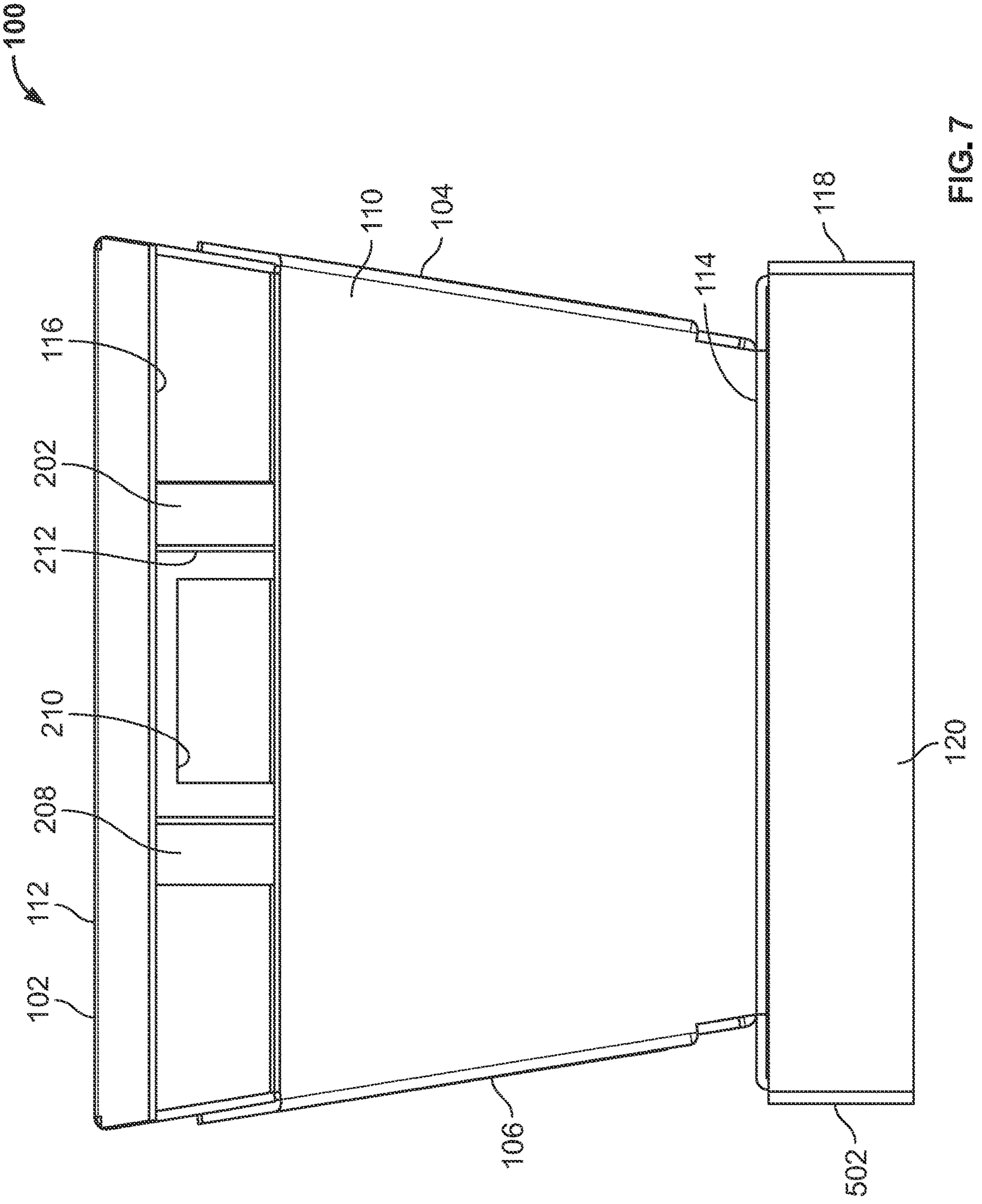
FIG. 7 is a left side view of the heat diffuser of FIGS. 1-6.
Figure 8:
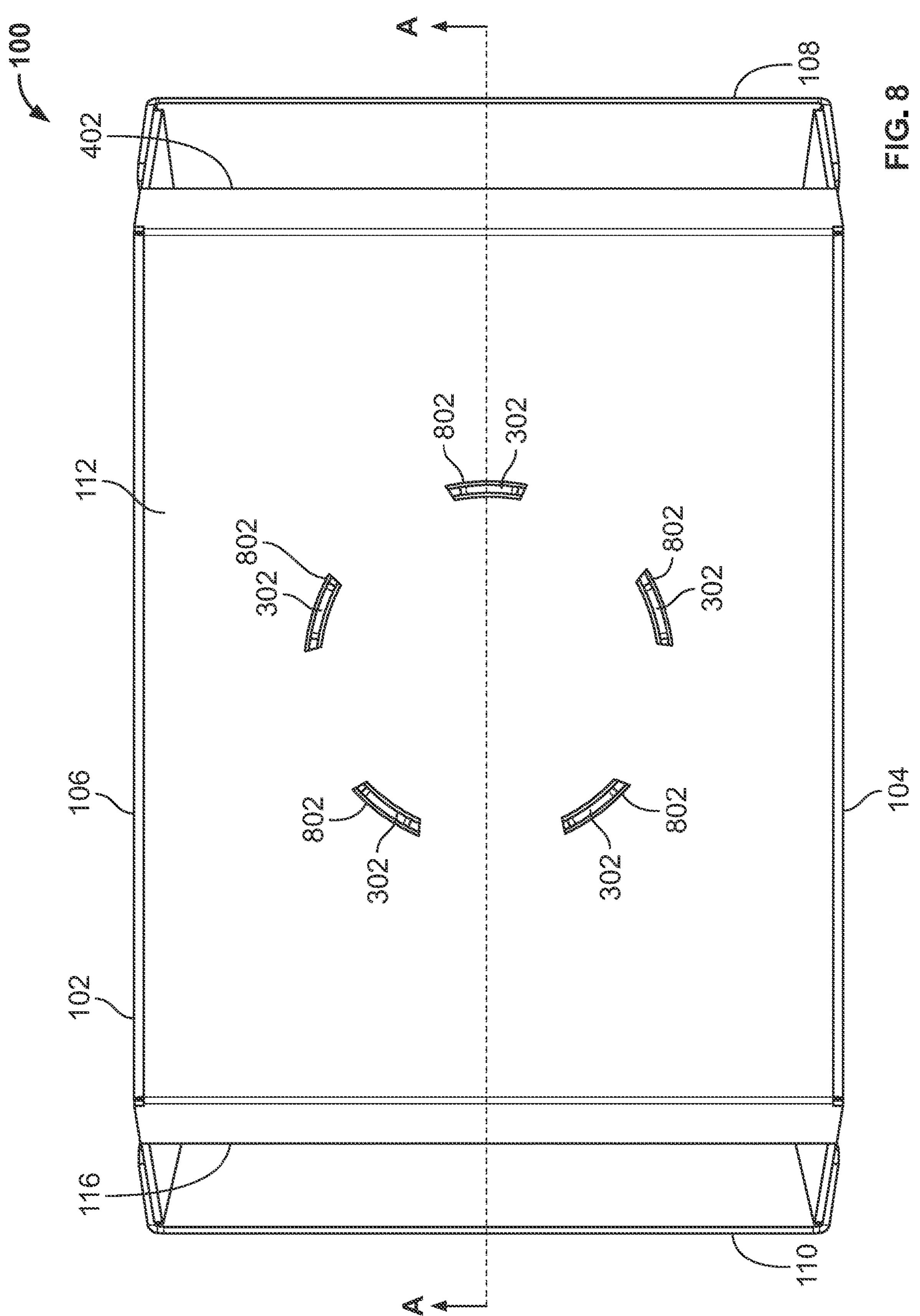
FIG. 8 is a top view of the heat diffuser of FIGS. 1-7.
Figure 9:
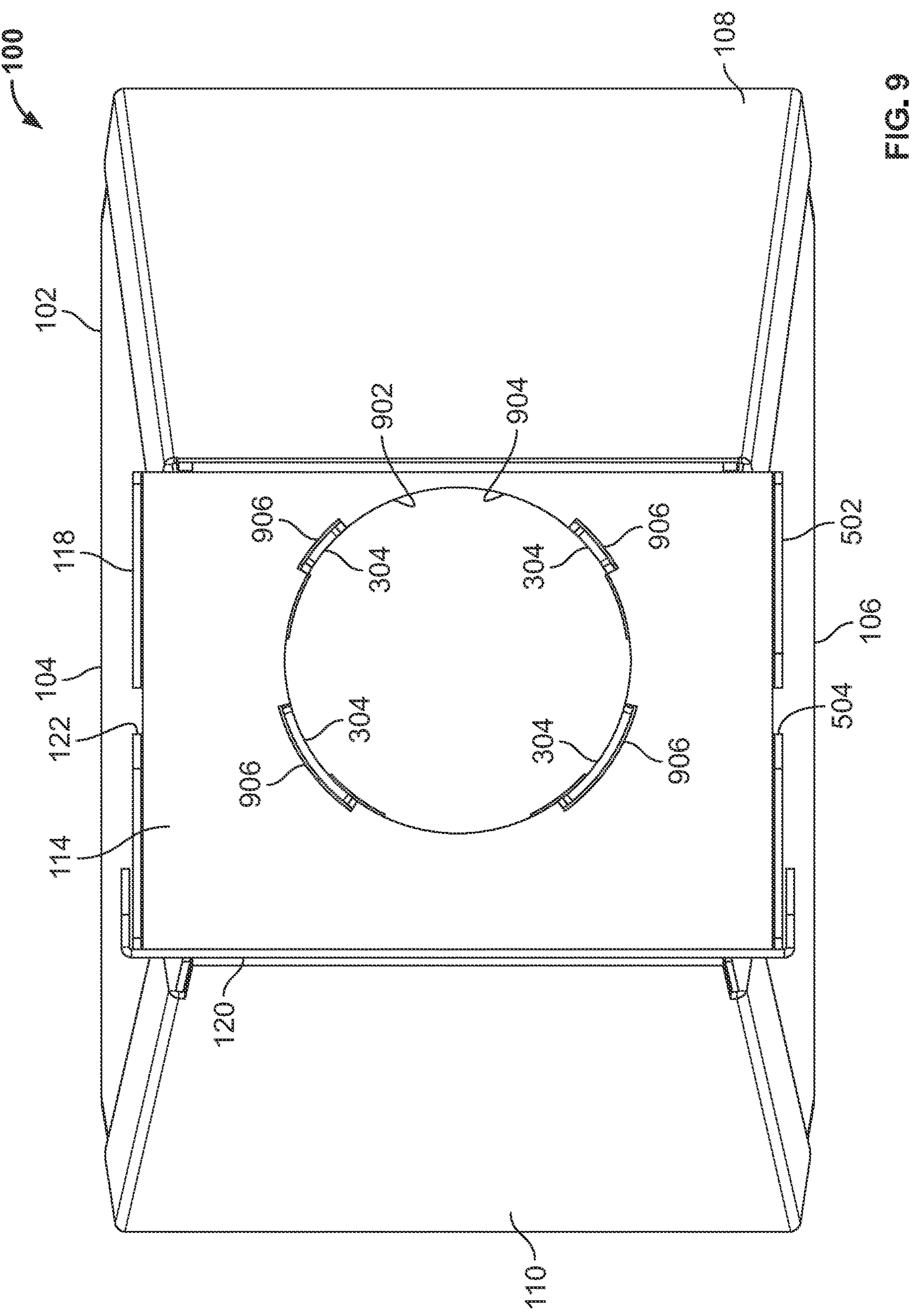
FIG. 9 is a bottom view of the heat diffuser of FIGS. 1-8.
Figure 10:
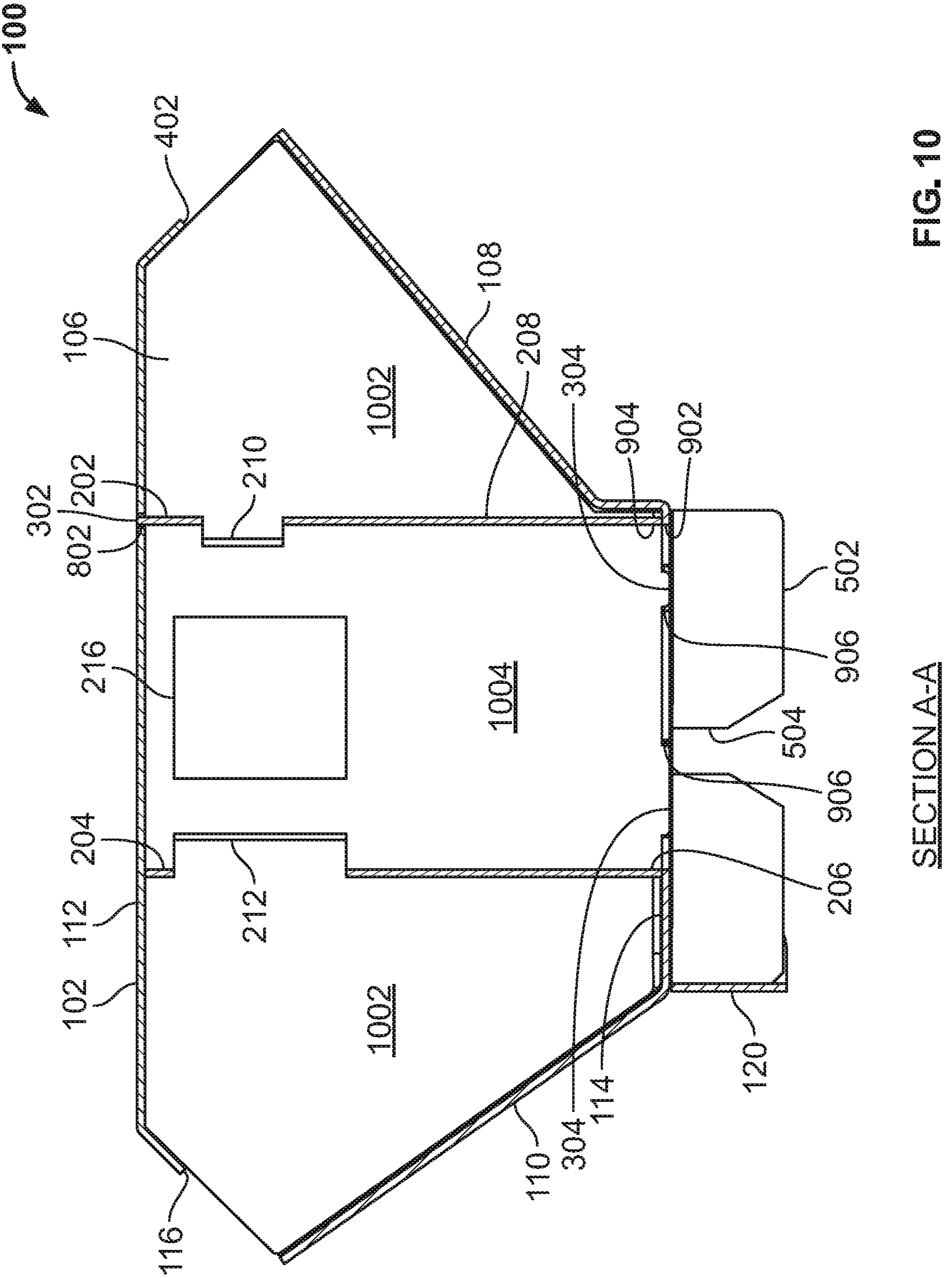
FIG. 10 is a cross-sectional view of the heat diffuser of FIGS. 1-9 taken along section A-A of FIG. 8.

FIG. 1 is a first perspective view of an example heat diffuser 100 constructed in accordance with the teachings of this disclosure. FIG. 2 is a second perspective view of the heat diffuser 100 of FIG. 1, with an example outer frame 102 of the heat diffuser 100 shown in phantom to enable viewing of an example inner frame 202 of the heat diffuser 100. FIG. 3 is a perspective view of the inner frame 202 of the heat diffuser 100 of FIGS. 1 and 2 shown in isolation. FIG. 4 is a front view of the heat diffuser 100 of FIGS. 1-3. FIG. 5 is a rear view of the heat diffuser 100 of FIGS. 1-4. FIG. 6 is a right side view of the heat diffuser 100 of FIGS. 1-5. FIG. 7 is a left side view of the heat diffuser 100 of FIGS. 1-6. FIG. 8 is a top view of the heat diffuser 100 of FIGS. 1-7. FIG. 9 is a bottom view of the heat diffuser 100 of FIGS. 1-8. FIG. 10 is a cross-sectional view of the heat diffuser 100 of FIGS. 1-9 taken along section A-A of FIG. 8.

The heat diffuser 100 of FIGS. 1-10 is configured to receive a flow of heat generated by and emitted from a burn pot of a pellet grill, and to distribute, diffuse, and/or otherwise direct the received flow of heat from the heat diffuser into a cooking chamber of the pellet grill in an optimum manner. In the illustrated example of FIGS. 1-10, the heat diffuser 100 includes an example outer frame 102 and an example inner frame 202. The outer frame 102 of the heat diffuser 100 contains, surrounds, carries, and/or otherwise supports the inner frame 202 of the heat diffuser 100. The outer frame 102 defines an example outer chamber 1002 of the heat diffuser 100, and the inner frame 202 defines an example inner chamber 1004 of the heat diffuser 100. The outer chamber 1002 surrounds and/or otherwise contains the inner chamber 1004. The outer chamber 1002 is in fluid communication with the inner chamber 1004 via a plurality of heat distribution openings that enable a flow of heat received in the inner chamber 1004 to pass from the inner chamber 1004 into the outer chamber 1002, as further described herein.

In the illustrated example of FIGS. 1-10, the outer frame 102 of the heat diffuser 100 includes an example front wall 104, an example rear wall 106, an example right sidewall 108, an example left sidewall 110, an example top wall 112, and an example bottom wall 114. The rear wall 106 is located opposite the front wall 104. The top wall 112 extends between the front wall 104 and the rear wall 106. The bottom wall 114 is located opposite the top wall 112, and extends between the front wall 104 and the rear wall 106. The right sidewall 108 extends upwardly from the bottom wall 114 toward the top wall 112, and extends between the front wall 104 and the rear wall 106. The left sidewall 110 is located opposite the right sidewall 108, extends upwardly from the bottom wall 114 toward the top wall 112, and extends between the front wall 104 and the rear wall 106.

The right sidewall 108 of the outer frame 102 of FIGS. 1-10 tapers outwardly from and is oriented at an example first angle 404 relative to the bottom wall 114 of the outer frame 102 as the right sidewall 108 extends upward from the bottom wall 114 toward the top wall 112 of the outer frame 102. The first angle 404 formed between the right sidewall 108 and the bottom wall 114 of the outer frame 102 is preferably between twenty and seventy degrees. In the illustrated example of FIGS. 1-10, the first angle 404 formed between the right sidewall 108 and the bottom wall 114 of the outer frame 102 is approximately forty degrees. In other examples, the first angle 404 formed between the right sidewall 108 and the bottom wall 114 of the outer frame 102 can instead be substantially greater than or substantially less than forty degrees.

The left sidewall 110 of the outer frame 102 of FIGS. 1-10 tapers outwardly from and is oriented at an example second angle 406 relative to the bottom wall 114 of the outer frame 102 as the left sidewall 110 extends upward from the bottom wall 114 toward the top wall 112 of the outer frame 102. The second angle 406 formed between the left sidewall 110 and the bottom wall 114 of the outer frame 102 is preferably between twenty and seventy degrees. In the illustrated example of FIGS. 1-10, the second angle 406 formed between the left sidewall 110 and the bottom wall 114 of the outer frame 102 is approximately fifty-five degrees. In other examples, the second angle 406 formed between the left sidewall 110 and the bottom wall 114 of the outer frame 102 can instead be substantially greater than or substantially less than fifty-five degrees.

The outer frame 102 of the heat diffuser 100 of FIGS. 1-10 further includes an example first intake opening 902 formed in and/or extending through the bottom wall 114 of the outer frame 102, with the first intake opening 902 being located between the front wall 104 and the rear wall 106 of the outer frame 102, and between the right sidewall 108 and the left sidewall 110 of the outer frame 102. The first intake opening 902 of the outer frame 102 of the heat diffuser 100 of FIGS. 1-10 is configured to receive a portion (e.g., a lower end) of the inner frame 202 of the heat diffuser 100 of FIGS. 1-10. The first intake opening 902 of the outer frame 102 is further configured to receive a flow of heat generated by and emitted from a burn pot of a pellet grill, with the flow of heat passing through the first intake opening 902 into the inner chamber 1004 of the heat diffuser 100, and then from the inner chamber 1004 through a plurality of heat distribution openings into the outer chamber 1002 of the heat diffuser 100. In the illustrated example of FIGS. 1-10, the first intake opening 902 of the outer frame 102 has a circular shape. In other examples, the first intake opening 902 of the outer frame 102 can instead have a non-circular shape (e.g., an oval shape, a triangular shape, a rectangular shape, a trapezoidal shape, a hexagonal shape, etc.).

The outer frame 102 of the heat diffuser 100 of FIGS. 1-10 further includes an example first exhaust opening 402 formed along the right sidewall 108 of the outer frame 102, with the first exhaust opening 402 being located between the front wall 104 and the rear wall 106 of the outer frame 102, and between the right sidewall 108 and the top wall 112 of the outer frame 102. The first exhaust opening 402 of the outer frame 102 of the heat diffuser 100 of FIGS. 1-10 is configured to exhaust a first portion of the flow of heat received from the burn pot of the pellet grill out of the outer chamber 1002 of the heat diffuser 100 in a first direction. For example, as shown in FIGS. 1-10, the first exhaust opening 402 is configured to exhaust a first portion of the flow of heat out of the outer chamber 1002 of the heat diffuser 100 in a direction that extends outwardly and upwardly from the right sidewall 108 of the outer frame 102 (e.g., to the right of the right sidewall 108, and toward or past the top wall 112 of the outer frame 102). In the illustrated example of FIGS. 1-10, the first exhaust opening 402 of the outer frame 102 has a rectangular shape. In other examples, the first exhaust opening 402 of the outer frame 102 can instead have a non-rectangular shape (e.g., a circular shape, an oval shape, a triangular shape, a trapezoidal shape, a hexagonal shape, etc.).

The first exhaust opening 402 of the outer frame 102 of FIGS. 1-10 is oriented at an example third angle 408 relative to the top wall 112 of the outer frame 102. The third angle 408 formed between the first exhaust opening 402 and the top wall 112 of the outer frame 102 is preferably between twenty and seventy degrees. In the illustrated example of FIGS. 1-10, the third angle 408 formed between the first exhaust opening 402 and the top wall 112 of the outer frame 102 is approximately forty-five degrees. In other examples, the third angle 408 formed between the first exhaust opening 402 and the top wall 112 of the outer frame 102 can instead be substantially greater than or substantially less than forty-five degrees.

The outer frame 102 of the heat diffuser 100 of FIGS. 1-10 further includes an example second exhaust opening 116 formed along the left sidewall 110 of the outer frame 102, with the second exhaust opening 116 being located between the front wall 104 and the rear wall 106 of the outer frame 102, and between the left sidewall 110 and the top wall 112 of the outer frame 102. The second exhaust opening 116 of the outer frame 102 of the heat diffuser 100 of FIGS. 1-10 is configured to exhaust a second portion of the flow of heat received from the burn pot of the pellet grill out of the outer chamber 1002 of the heat diffuser 100 in a second direction, with the second direction differing from the first direction associated with the first exhaust opening 402 described above. For example, as shown in FIGS. 1-10, the second exhaust opening 116 is configured to exhaust a second portion of the flow of heat out of the outer chamber 1002 of the heat diffuser 100 in a direction that extends outwardly and upwardly from the left sidewall 110 of the outer frame 102 (e.g., to the left of the left sidewall 110, and toward or past the top wall 112 of the outer frame 102). In the illustrated example of FIGS. 1-10, the second exhaust opening 116 of the outer frame 102 has a rectangular shape. In other examples, the second exhaust opening 116 of the outer frame 102 can instead have a non-rectangular shape (e.g., a circular shape, an oval shape, a triangular shape, a trapezoidal shape, a hexagonal shape, etc.).

The second exhaust opening 116 of the outer frame 102 of FIGS. 1-10 is oriented at an example fourth angle 410 relative to the top wall 112 of the outer frame 102. The fourth angle 410 formed between the second exhaust opening 116 and the top wall 112 of the outer frame 102 is preferably between twenty and seventy degrees. In the illustrated example of FIGS. 1-10, the fourth angle 410 formed between the second exhaust opening 116 and the top wall 112 of the outer frame 102 is approximately forty-five degrees. In other examples, the fourth angle 410 formed between the second exhaust opening 116 and the top wall 112 of the outer frame 102 can instead be substantially greater than or substantially less than forty-five degrees.

As described above, the outer frame 102 of the heat diffuser 100 of FIGS. 1-10 includes the front wall 104, the rear wall 106, the right sidewall 108, the left sidewall 110, the top wall 112, the bottom wall 114, the first intake opening 902, the first exhaust opening 402, and the second exhaust opening 116, with the aforementioned components of the outer frame 102 individually and collectively defining the outer chamber 1002 of the heat diffuser 100. The outer frame 102 of the heat diffuser 100 of FIGS. 1-10 further includes one or more positioning flange(s) configured to position the heat diffuser 100 on and/or relative to a housing of an engine assembly of a pellet grill, as further described herein. In the illustrated example of FIGS. 1-10, the outer frame 102 of the heat diffuser 100 includes an example first positioning flange 118, an example second positioning flange 502, and an example third positioning flange 120. The first positioning flange 118 is located along and extends downwardly from a front edge of the bottom wall 114 of the outer frame 102. The second positioning flange 502 is located along and extends downwardly from a rear edge of the bottom wall 114 of the outer frame 102. The third positioning flange 120 is located along and extends downwardly from a left side edge of the bottom wall 114 of the outer frame 102, with the third positioning flange 120 extending between the first positioning flange 118 and the second positioning flange 502.

The first positioning flange 118, the second positioning flange 502, and the third positioning flange 120 of the outer frame 102 of FIGS. 1-10 are respectively configured such that when the heat diffuser 100 of FIGS. 1-10 is positioned on and/or relative to a housing of an engine assembly of a pellet grill, the first positioning flange 118 will be located along a first wall (e.g., a front wall) of the housing, the second positioning flange 502 will be located along a second wall (e.g., a rear wall) of the housing, and the third positioning flange 120 will be located along a third wall (e.g., a left sidewall) of the housing. The third positioning flange 120 is further configured to prevent the heat diffuser 100 from being positioned improperly (e.g., backwards) on and/or relative to the housing of the engine assembly of the pellet grill.

In the illustrated example of FIGS. 1-10, the first positioning flange 118 includes an example first alignment notch 122, and the second positioning flange 502 includes an example second alignment notch 504. The first alignment notch 122 and the second alignment notch 504 are respectively configured to receive, engage, and/or otherwise mate with corresponding ones of a first alignment tab and a second alignment tab to align the heat diffuser 100 relative to a housing of an engine assembly of a pellet grill, and/or to align the heat diffuser 100 relative to a burn pot of the pellet grill that may be contained in and/or carried by the housing of the engine assembly of the pellet grill. In some examples, the first alignment tab and the second alignment tab to be received by the first alignment notch 122 and the second alignment notch 504 are coupled to the housing of the engine assembly of the pellet grill, as further described herein.

In the illustrated example of FIGS. 1-10, the outer frame 102 of the heat diffuser 100 includes a total of three positioning flanges (e.g., the first positioning flange 118, the second positioning flange 502, and the third positioning flange 120. In other examples, the outer frame 102 of the heat diffuser 100 can instead include a different number (e.g., one, two, four, etc.) of positioning flanges. In the illustrated example of FIGS. 1-10, each of the first positioning flange 118, the second positioning flange 502, and the third positioning flange 120 of the outer frame 102 is oriented at a perpendicular angle relative to the bottom wall 114 of the outer frame 102. In other examples, the first positioning flange 118, the second positioning flange 502, and/or the third positioning flange 120 of the outer frame 102 can instead be oriented at a non-perpendicular angle (e.g., great or less than ninety degrees) relative to the bottom wall 114 of the outer frame 102. In the illustrated example of FIGS. 1-10, the first positioning flange 118 and the second positioning flange 502 of the outer frame 102 each include a total of one alignment notch (e.g., the first alignment notch 122 in the case of the first positioning flange 118, and the second alignment notch 504 in the case of the second positioning flange 502). In other examples, the first positioning flange 118 and/or the second positioning flange 502 of the outer frame 102 can instead include a different number (e.g., two, three, four, etc.) of alignment notches. In still other examples, the third positioning flange 120 can additionally or alternatively include one or more positioning flanges constructed in a manner similar to that shown in relation to the first alignment notch 122 and/or the second alignment notch 504.

The inner frame 202 of the heat diffuser 100 of FIGS. 1-10 is located within the outer frame 102 of the heat diffuser 100. The inner chamber 1004 of the heat diffuser 100 of FIGS. 1-10 is accordingly located within the outer chamber 1002 of the heat diffuser 100. In the illustrated example of FIGS. 1-10, the inner frame 202 of the heat diffuser 100 includes an example upper end 204, an example lower end 206, and an example sidewall 208. The upper end 204 of the inner frame 202 faces toward, is adjacent to, and/or is located along the top wall 112 of the outer frame 102. The lower end 206 of the inner frame 202 is located opposite the upper end 204 of the inner frame 202, such that the lower end 206 faces toward, is adjacent to, and/or is located along the bottom wall 114 of the outer frame 102. The sidewall 208 of the inner frame 202 extends between the upper end 204 and the lower end 206 of the inner frame 202, and/or between the top wall 112 and the bottom wall 114 of the outer frame 102.

In the illustrated example of FIGS. 1-10, the upper end 204 and the lower end 206 of the inner frame 202 are both open. In other examples, the upper end 204 of the inner frame 202 can instead be closed, with the lower end 206 of the inner frame 202 remaining at least partially open to facilitate the passage of a flow of heat from a burn pot of a pellet grill into the inner chamber 1004 of the heat diffuser 100. In the illustrated example of FIGS. 1-10, the sidewall 208 of the inner frame 202 has a cylindrical shape. In other examples, the sidewall 208 of the inner frame 202 can instead have a non-cylindrical (e.g., spherical, conical, pyramidal, cuboid, prismatic, etc.) shape. In the illustrated example of FIGS. 1-10, the sidewall 208 of the inner frame 202 has a circular cross-sectional profile. In other examples, the sidewall 208 of the inner frame 202 can instead have a non-circular (e.g., oval shaped, triangular, rectangular, trapezoidal, hexagonal, etc.) cross-sectional profile.

The inner frame 202 of the heat diffuser 100 of FIGS. 1-10 further includes an example second intake opening 904 formed at and/or along the lower end 206 of the inner frame 202, with the second intake opening 904 being aligned with (e.g., concentrically and/or coaxially aligned with) and/or otherwise being in fluid communication with the first intake opening 902 formed in the bottom wall 114 of the outer frame 102 of the heat diffuser 100. Like the first intake opening 902 of the outer frame 102, the second intake opening 904 of the outer frame 202 is configured to receive a flow of heat generated by and emitted from a burn pot of a pellet grill, with the flow of heat passing through the second intake opening 904 into the inner chamber 1004 of the heat diffuser 100, and then from the inner chamber 1004 through a plurality of heat distribution openings into the outer chamber 1002 of the heat diffuser 100. In the illustrated example of FIGS. 1-10, the second intake opening 904 of the inner frame 202 has a circular shape. In other examples, the second intake opening 904 of the inner frame 202 can instead have a non-circular shape (e.g., an oval shape, a triangular shape, a rectangular shape, a trapezoidal shape, a hexagonal shape, etc.).

The inner frame 202 of the heat diffuser 100 of FIGS. 1-10 further includes one or more heat distribution opening(s) formed in and/or extending through the sidewall 208 of the inner frame 202, with the heat distribution opening(s) being configured to distribute, diffuse, and/or otherwise direct a flow of heat from the inner chamber 1004 of the heat diffuser 100 into the outer chamber 1002 of the heat diffuser 100. In the illustrated example of FIGS. 1-10, the inner frame 202 includes an example first heat distribution opening 210, an example second heat distribution opening 212, an example third heat distribution opening 214, and an example fourth heat distribution opening 216, each of which is formed in and/or extends through the sidewall of the inner frame 202.

The first heat distribution opening 210 of FIGS. 1-10 is located on and/or along the right side of the sidewall 208. The first heat distribution opening 210 faces and/or is oriented toward the right sidewall 108 and/or the first exhaust opening 402 of the outer frame 102 of the heat diffuser 100. The first heat distribution opening 210 is configured to distribute, diffuse, and/or otherwise direct a first portion of the flow of heat from the inner chamber 1004 of the heat diffuser 100 into the outer chamber 1002 of the heat diffuser 100 in a first direction oriented and/or extending toward the right sidewall 108 and/or the first exhaust opening 402 of the outer frame 102 of the heat diffuser 100. The second heat distribution opening 212 of FIGS. 1-10 is located on and/or along the left side of the sidewall 208 (e.g., opposite the first heat distribution opening 210). The second heat distribution opening 212 faces and/or is oriented toward the left sidewall 110 and/or the second exhaust opening 116 of the outer frame 102 of the heat diffuser 100. The second heat distribution opening 212 is configured to distribute, diffuse, and/or otherwise direct a second portion of the flow of heat from the inner chamber 1004 of the heat diffuser 100 into the outer chamber 1002 of the heat diffuser 100 in a second direction oriented and/or extending toward the left sidewall 110 and/or the second exhaust opening 116 of the outer frame 102 of the heat diffuser 100.

The third heat distribution opening 214 of FIGS. 1-10 is located on and/or along the front side of the sidewall 208 (e.g., between the first heat distribution opening 210 and the second heat distribution opening 212). The third heat distribution opening 214 faces and/or is oriented toward the front wall 104 of the outer frame 102 of the heat diffuser 100. The third heat distribution opening 214 is configured to distribute, diffuse, and/or otherwise direct a third portion of the flow of heat from the inner chamber 1004 of the heat diffuser 100 into the outer chamber 1002 of the heat diffuser 100 in a third direction oriented and/or extending toward the front wall 104 of the outer frame 102 of the heat diffuser 100. The fourth heat distribution opening 216 of FIGS. 1-10 is located on and/or along the rear side of the sidewall 208 (e.g., opposite the third heat distribution opening 214, and between the first heat distribution opening 210 and the second heat distribution opening 212). The fourth heat distribution opening 216 faces and/or is oriented toward the rear wall 106 of the outer frame 102 of the heat diffuser 100. The fourth heat distribution opening 216 is configured to distribute, diffuse, and/or otherwise direct a fourth portion of the flow of heat from the inner chamber 1004 of the heat diffuser 100 into the outer chamber 1002 of the heat diffuser 100 in a fourth direction oriented and/or extending toward the rear wall 106 of the outer frame 102 of the heat diffuser 100.

In the illustrated example of FIGS. 1-10, the inner frame 202 includes a total of four heat distribution openings. In other examples, the inner frame 202 can instead include a different number (e.g., one, two, three, five, six, etc.) of heat distribution openings. In the illustrated example of FIGS. 1-10, the first heat distribution opening 210, the second heat distribution opening 212, the third heat distribution opening 214, and the fourth heat distribution opening 216 are evenly distributed and/or evenly circumferentially spaced about the sidewall 208 of the inner frame 202. In other examples, the relative distribution, spacing and/or location of the first heat distribution opening 210, the second heat distribution opening 212, the third heat distribution opening 214, and/or the fourth heat distribution opening 216 can differ from the arrangement shown in FIGS. 1-10.

In the illustrated example of FIGS. 1-10, the first heat distribution opening 210, the second heat distribution opening 212, the third heat distribution opening 214, and the fourth heat distribution opening 216 each have a rectangular shape. In other examples, the first heat the first heat distribution opening 210, the second heat distribution opening 212, the third heat distribution opening 214, and/or the fourth heat distribution opening 216 can instead have a non-rectangular shape (e.g., a circular shape, an oval shape, a triangular shape, a trapezoidal shape, a hexagonal shape, etc.). In the illustrated example of FIGS. 1-10, the first heat distribution opening 210 is smaller than the second heat distribution opening 212 (e.g., the area of the first heat distribution opening 210 is less than the area of the second heat distribution opening 212). In other examples, the first heat distribution opening 210 can instead be bigger than or the same size as the second heat distribution opening 212 (e.g., the area of the first heat distribution opening 210 is greater than or equal to the area of the second heat distribution opening 212). In the illustrated example of FIGS. 1-10, the third heat distribution opening 214 is the same size as the fourth heat distribution opening 216 (e.g., the area of the third heat distribution opening 214 is equal to the area of the fourth heat distribution opening 216). In other examples, the third heat distribution opening 214 can instead be smaller than or bigger than the fourth heat distribution opening 216 (e.g., the area of the third heat distribution opening 214 is less than or greater than the area of the fourth heat distribution opening 216).

The inner frame 202 of the heat diffuser 100 of FIGS. 1-10 is configured to be aligned, secured, and or retained within the outer frame 102 of the heat diffuser 100 via a plurality of upper and/or lower alignment members. In the illustrated example of FIGS. 1-10, the inner frame 202 includes one or more example upper alignment tab(s) 302 integrally formed with the sidewall 208 of the inner frame 202, with the upper alignment tab(s) 302 being located along and/or extending upward from the upper end 204 of the inner frame 202. The upper alignment tab(s) 302 of the inner frame 202 are configured to be received within, to engage, and/or to otherwise mate with corresponding ones of example upper alignment opening(s) 802 formed in and/or extending through the top wall 112 of the outer frame 102, thereby aligning, securing, and/or retaining the upper end 204 of the inner frame 202 relative to the top wall 112 of the outer frame 102. In the illustrated example of FIGS. 1-10, the inner frame 202 includes a total of five upper alignment tabs 302, and the outer frame 102 includes a corresponding total of five upper alignment openings 802. In other examples, the inner frame 202 can instead include a different number (e.g., one, two, three, four, six, etc.) of upper alignment tabs 302, and the outer frame 102 can instead include a corresponding different number of upper alignment openings 802. In the illustrated example of FIGS. 1-10, the upper alignment tabs 302 are evenly distributed and/or evenly circumferentially spaced about the upper end 204 of the inner frame 202. In other examples, the relative distribution, spacing and/or location of respective ones of the upper alignment tabs 302 can differ from the arrangement shown in FIGS. 1-10.

In the illustrated example of FIGS. 1-10, the inner frame 202 further includes one or more example lower alignment tab(s) 304 integrally formed with the sidewall 208 of the inner frame 202, with the lower alignment tab(s) 304 being located along and/or extending downward from the lower end 206 of the inner frame 202. The lower alignment tab(s) 304 of the inner frame 202 are configured to be received within, to engage, and/or to otherwise mate with corresponding ones of example lower alignment notch(es) 906 formed in and/or extending through the bottom wall 114 of the outer frame 102, thereby aligning, securing, and/or retaining the lower end 206 of the inner frame 202 relative to the bottom wall 114 of the outer frame 102.

In the illustrated example of FIGS. 1-10, the inner frame 202 includes a total of four lower alignment tabs 304, and the outer frame 102 includes a corresponding total of four lower alignment notches 906. In other examples, the inner frame 202 can instead include a different number (e.g., one, two, three, five, six, etc.) of lower alignment tabs 304, and the outer frame 102 can instead include a corresponding different number of lower alignment notches 906. In the illustrated example of FIGS. 1-10, the lower alignment tabs 304 are unevenly distributed and/or unevenly circumferentially spaced about the lower end 206 of the inner frame 202. In other examples, the relative distribution, spacing and/or location of respective ones of the lower alignment tabs 304 can differ from the arrangement shown in FIGS. 1-10.

Figure 11:
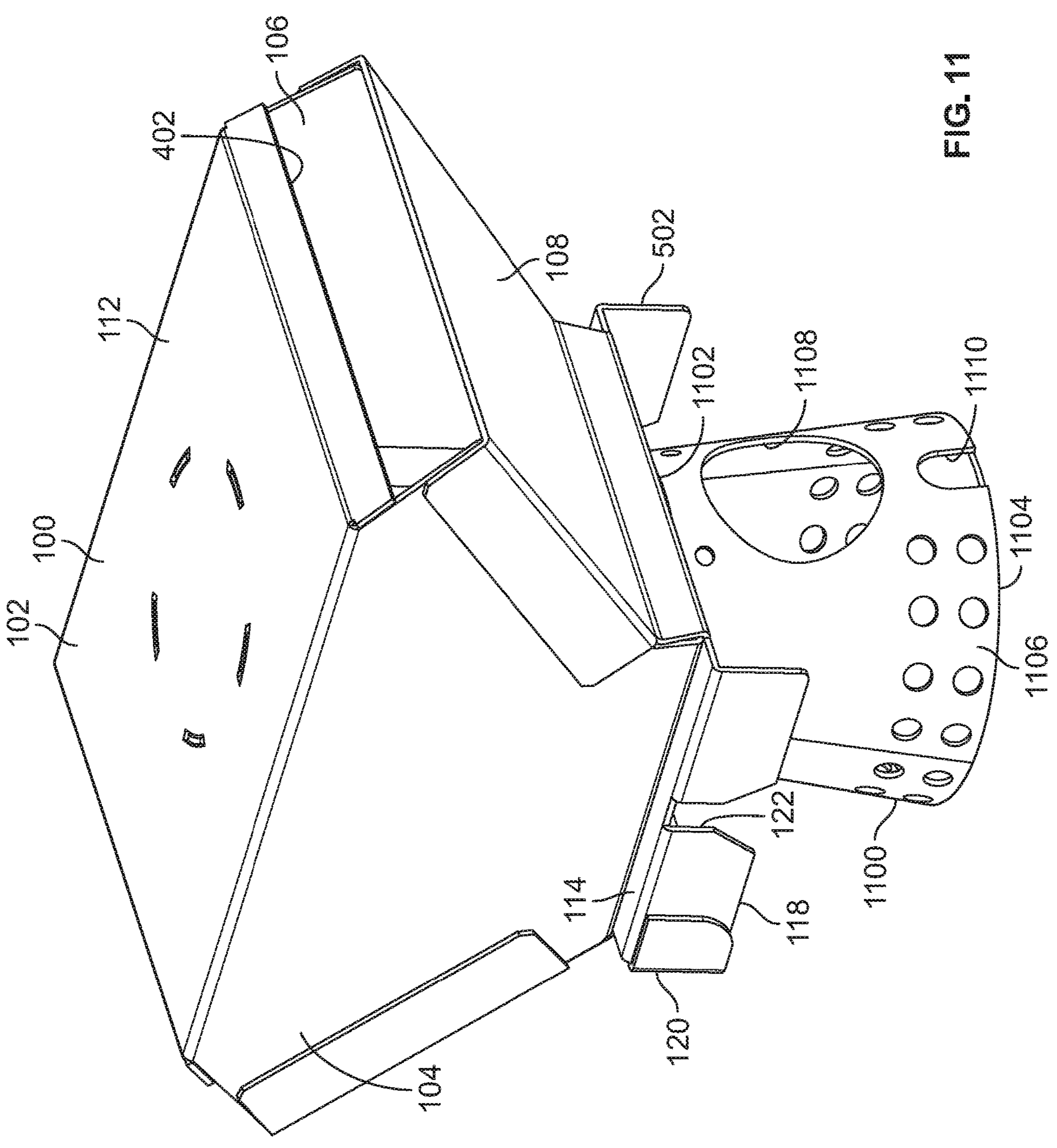
FIG. 11 is a perspective view of the heat diffuser of FIGS. 1-10 positioned above an example burn pot.
Figure 12:
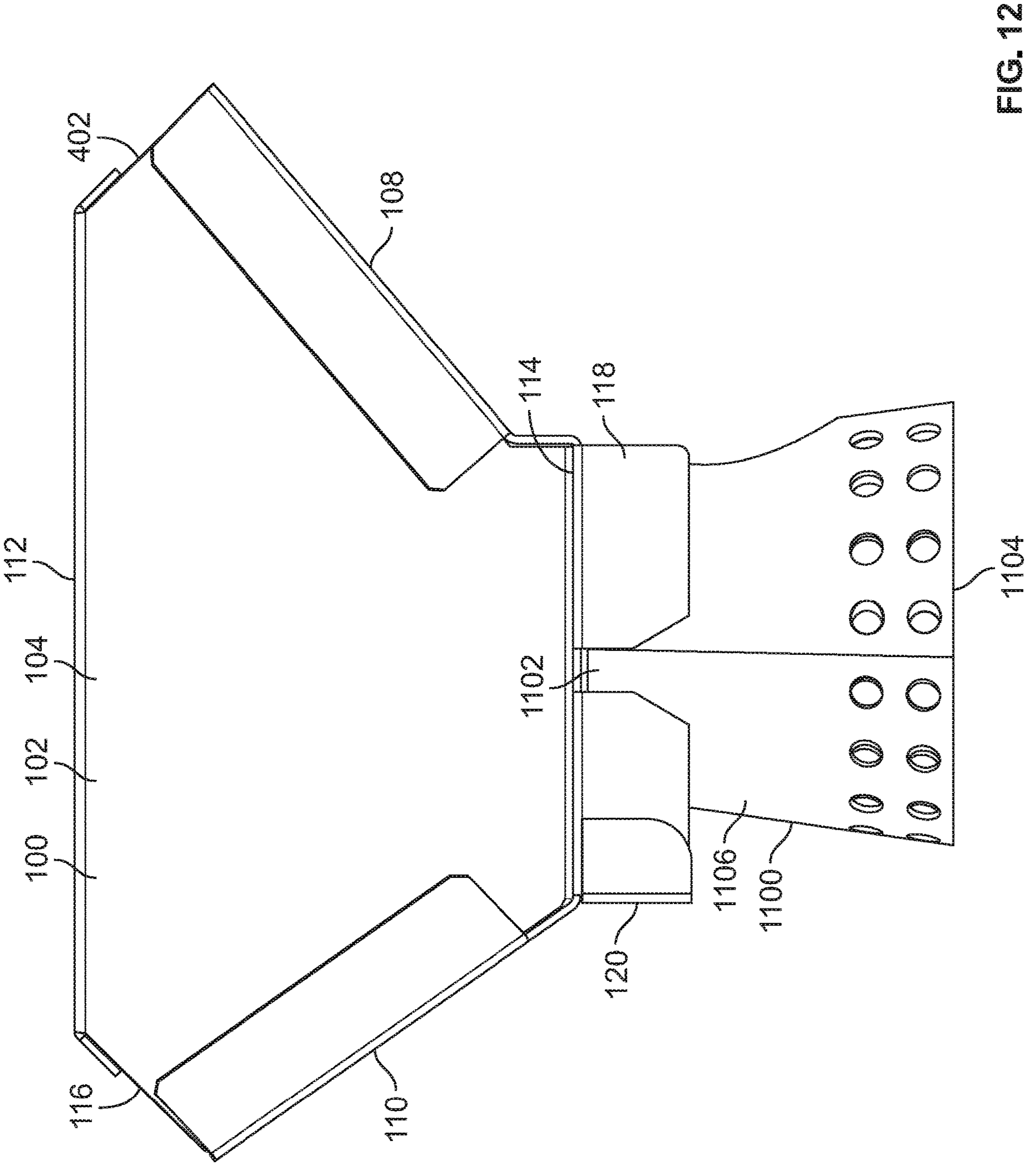
FIG. 12 is a right side view of the heat diffuser of FIGS. 1-11 positioned above the burn pot of FIG. 11.
Figure 13:
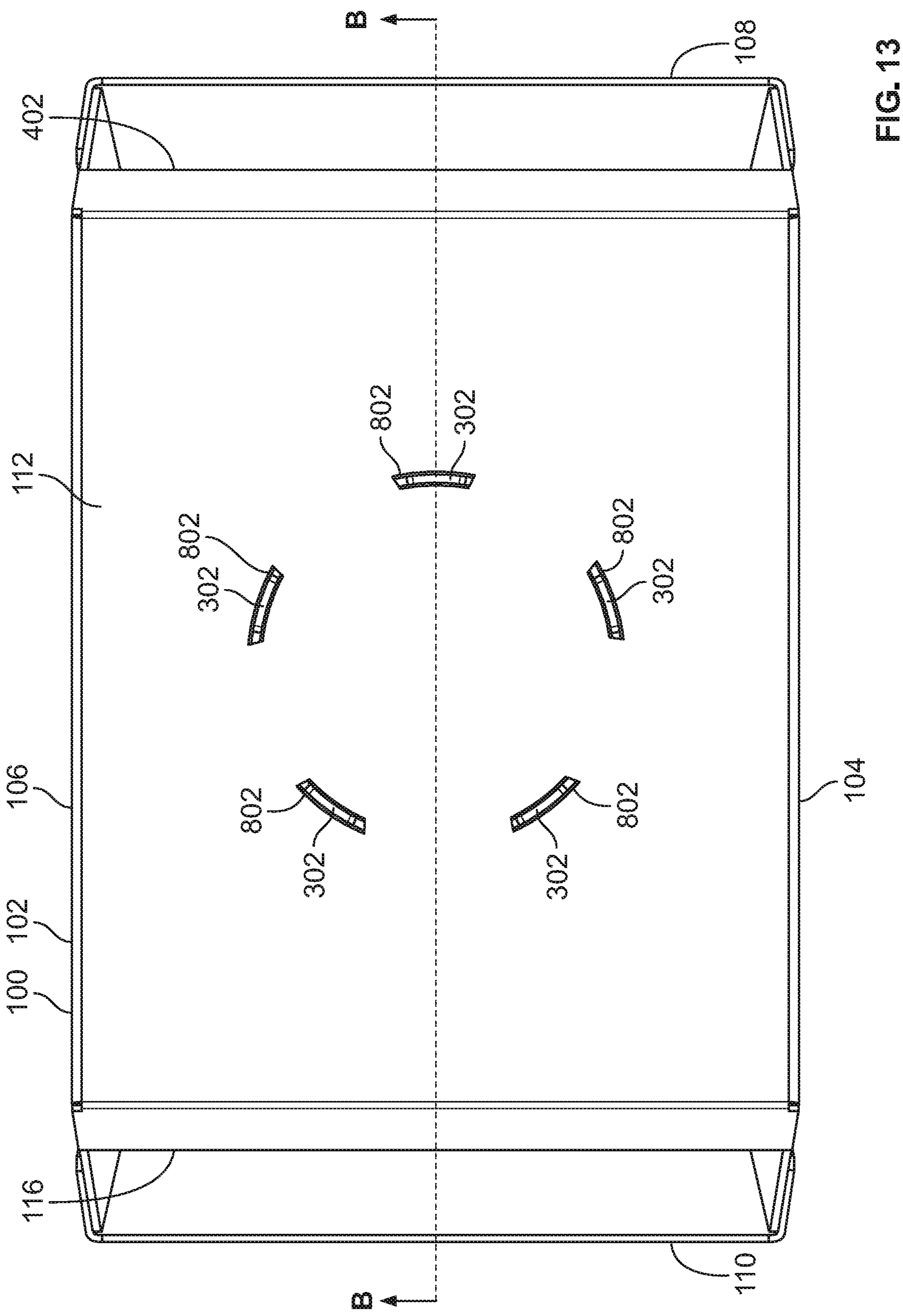
FIG. 13 is a top view of the heat diffuser of FIGS. 1-12 positioned above the burn pot of FIGS. 11 and 12.
Figure 14:
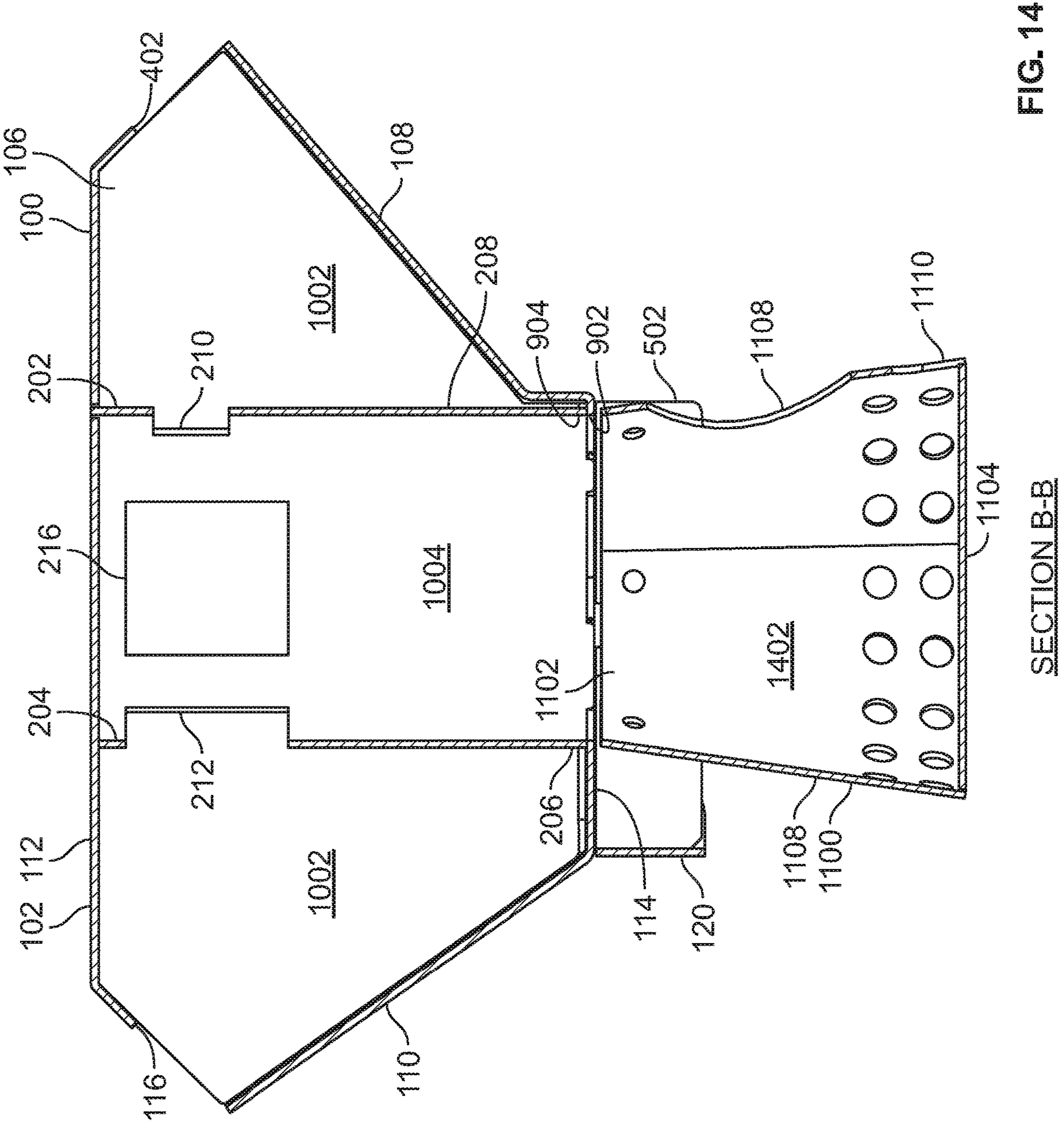
FIG. 14 is a cross-sectional view taken along section B-B of FIG. 13, showing the heat diffuser of FIGS. 1-13 positioned above the burn pot of FIGS. 11-13.

FIG. 11 is a perspective view of the heat diffuser 100 of FIGS. 1-10 positioned above an example burn pot 1100. FIG. 12 is a right side view of the heat diffuser 100 of FIGS. 1-11 positioned above the burn pot 1100 of FIG. 11. FIG. 13 is a top view of the heat diffuser 100 of FIGS. 1-12 positioned above the burn pot 1100 of FIGS. 11 and 12. FIG. 14 is a cross-sectional view taken along section B-B of FIG. 13, showing the heat diffuser 100 of FIGS. 1-13 positioned above the burn pot 1100 of FIGS. 11-13. The burn pot 1100 of FIGS. 11-14 is configured to generate and emit a flow of heat resulting from the combustion of pellet fuel (e.g., combustible wood pellets) contained within the burn pot 1100. In the illustrated example of FIGS. 1-10, the burn pot 1100 includes an example upper end 1102, an example lower end 1104, and an example sidewall 1106. The upper end 1102 of the burn pot 1100 faces toward, is adjacent to, and/or is located along the bottom wall 114 of the outer frame 102 and/or the lower end 206 of the inner frame 202. The lower end 1104 of the burn pot 1100 is located opposite the upper end 1102 of the burn pot 1100. The sidewall 1106 of the burn pot 1100 extends between the upper end 1102 and the lower end 1104 of the burn pot 1100. The upper end 1102, the lower end 1104, and the sidewall 1106 of the burn pot 1100 individually and collectively defining an example combustion chamber 1402 that generates heat as pellet fuel contained within the combustion chamber 1402 combusts and/or burns. In response to such combustion, a flow of heat is emitted from the combustion chamber 1402 of the burn pot 1100 toward and/or into the heat diffuser 100, as further described herein.

In the illustrated example of FIGS. 11-14, the upper end 1102 of the burn pot 1100 is open, and the lower end 1104 of the burn pot 1100 is closed. The open upper end 1102 of the burn pot 1100 facilitates the passage of a flow of heat upward from and out of the combustion chamber 1402 of the burn pot 1100, with the flow of heat thereafter passing into the inner chamber 1004 of the inner frame 202 of the heat diffuser 100. In this regard, the open upper end 1102 of the burn pot 1100 is aligned with (e.g., concentrically and/or coaxially aligned with) and/or is otherwise in fluid communication with the first intake opening 902 formed in the bottom wall 114 of the outer frame 102 of the heat diffuser 100 and/or the second intake opening 904 located along the lower end 206 of the inner frame 202 of the heat diffuser 100. The closed lower end 1104 of the burn pot 1100 supports pellet fuel (e.g., combustible wood pellets) located within the combustion chamber 1402 of the burn pot 1100 to facilitate the combustion of such pellet fuel within the combustion chamber 1402. In other examples, the lower end 1104 of the burn pot 1100 can instead be at least partially open to facilitate the passage of ash produced from combustion of the pellet fuel in a downward direction out of the combustion chamber 1402 of the burn pot 1100.

In the illustrated example of FIGS. 11-14, the sidewall 1106 of the burn pot 1100 has a conical shape, with the sidewall 1106 tapering inwardly moving from the lower end 1104 toward the upper end 1102 of the burn pot 1100. In other examples, the sidewall 1106 of the burn pot 1100 can instead have a non-conical (e.g., spherical, cylindrical, pyramidal, cuboid, prismatic, etc.) shape. In the illustrated example of FIGS. 11-14, the sidewall 1106 of the burn pot 1100 has a circular cross-sectional profile. In other examples, the sidewall 1106 of the burn pot 1100 can instead have a non-circular (e.g., oval shaped, triangular, rectangular, trapezoidal, hexagonal, etc.) cross-sectional profile.

The burn pot 1100 of FIGS. 11-14 further includes an example first opening 1108 and an example second opening 1110, each of which is formed in and/or extends through the sidewall 1106 of the burn pot 1100. The first opening 1108 is located on and/or along the right side of the sidewall 1106, and below the bottom wall 114 of the outer frame 102 of the heat diffuser 100. The first opening 1108 is configured to receive an end of an auger tube and/or an end of an auger of a pellet grill. The second opening 1110 is located on and/or along the right side of the sidewall 1106, below the bottom wall 114 of the outer frame 102 of the heat diffuser 100, and below the first opening 1108 of the burn pot 1100. The second opening 1110 is configured to receive an end of an ignitor of a pellet grill.

Figure 15:
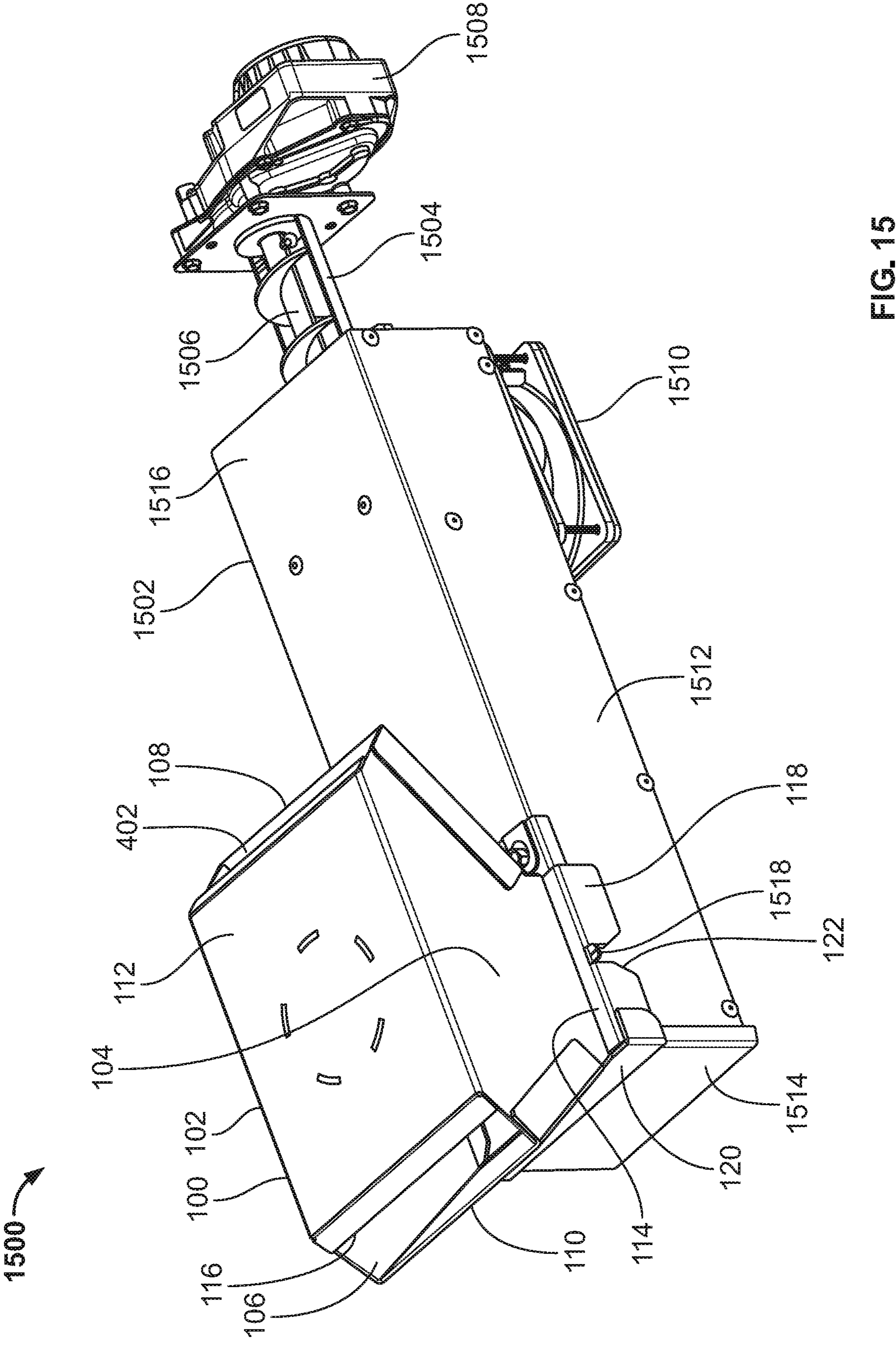
FIG. 15 is a perspective view of an example engine assembly including the heat diffuser of FIGS. 1-14 and the burn pot of FIGS. 11-14.
Figure 16:
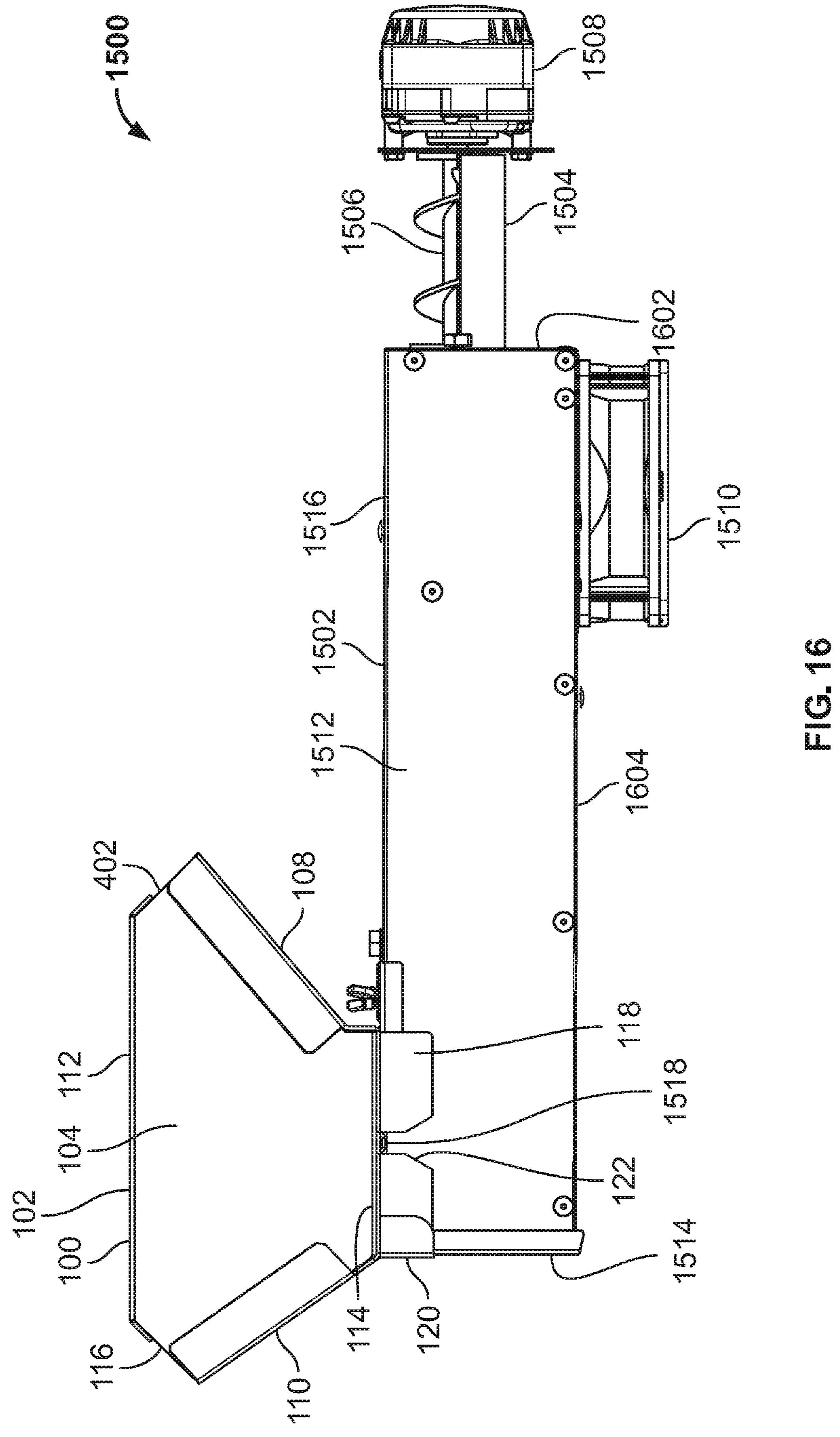
FIG. 16 is a right side view of the engine assembly of FIG. 15.
Figure 17:
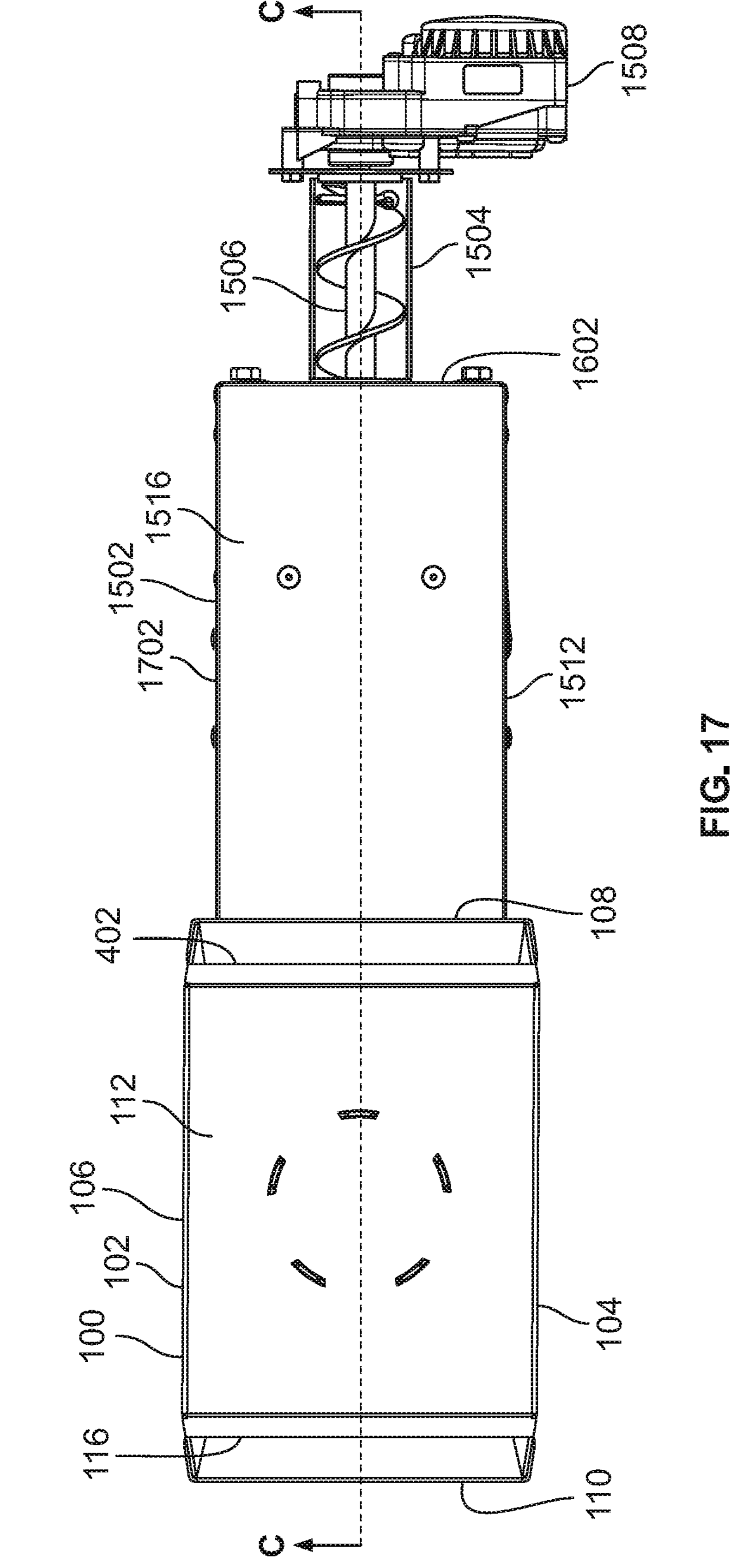
FIG. 17 is a top view of the engine assembly of FIGS. 15 and 16.
Figure 18:
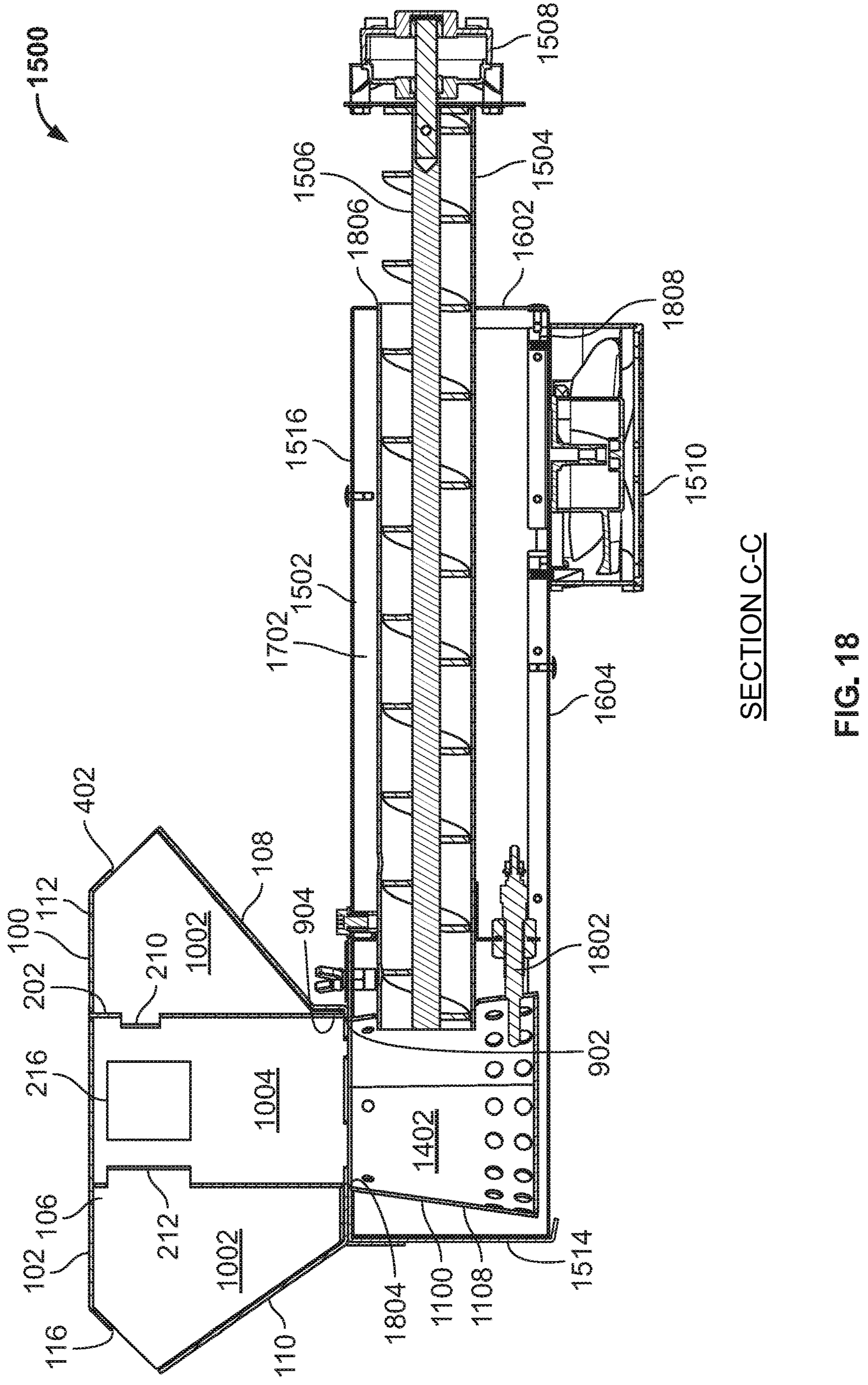
FIG. 18 is a cross-sectional view of the engine assembly of FIGS. 15-17 taken along section C-C of FIG. 17.

FIG. 15 is a perspective view of an example engine assembly 1500 including the heat diffuser 100 of FIGS. 1-14 and the burn pot 1100 of FIGS. 11-14. FIG. 16 is a right side view of the engine assembly 1500 of FIG. 15. FIG. 17 is a top view of the engine assembly 1500 of FIGS. 15 and 16. FIG. 18 is a cross-sectional view of the engine assembly 1500 of FIGS. 15-17 taken along section C-C of FIG. 17. In addition to including the heat diffuser 100 and the burn pot 1100, the engine assembly 1500 of FIGS. 15-18 further includes an example housing 1502, an example auger tube 1504, an example auger 1506, an example auger motor 1508, an example ignitor 1802, and an example fan 1510.

The housing 1502 of the engine assembly 1500 of FIGS. 15-18 contains, encloses, and/or carries at least a portion of the burn pot 1100, at least a portion of the auger tube 1504, at least a portion of the auger 1506, and at least a portion of the ignitor 1802. For example, as shown in FIGS. 15-18, the burn pot 1100 and the ignitor 1802 are both located within the housing 1502, as are portions of the auger tube 1504 and the auger 1506. In the illustrated example of FIGS. 15-18, the housing 1502 of the engine assembly 1500 is a hollow, box-shaped structure that includes an example front wall 1512, an example rear wall 1702, an example right sidewall 1602, an example left sidewall 1514, an example top wall 1516, and an example bottom wall 1604. The housing 1502 of FIGS. 15-18 includes an example first opening 1804 formed in and extending through the top wall 1516 of the housing 1502 proximate the location of the burn pot 1100. The first opening 1804 of the housing 1502 is aligned with (e.g., concentrically and/or coaxially aligned with) and/or otherwise is in fluid communication with the open upper end 1102 of the burn pot 1100, the first intake opening 902 formed in the bottom wall 114 of the outer frame 102 of the heat diffuser 100, and the second intake opening 904 located along the lower end 206 of the inner frame 202 of the heat diffuser 100. The first opening 1804 is configured to enable a flow of heat generated by and/or emitted from the combustion chamber 1402 of the burn pot 1100 to pass through the first opening 1804 of the housing 1502, through the first intake opening 902 of the outer frame 102 of the heat diffuser 100, through the second intake opening 904 of the inner frame 202 of the heat diffuser 100, and into the inner chamber 1004 of the inner frame 202 of the heat diffuser 100. The housing 1502 of FIGS. 15-18 further includes an example second opening 1806 formed in and extending through the right sidewall 1602 of the housing 1502. The second opening 1806 is configured to receive the auger tube 1504 such that the auger tube 1504 extends through the rear wall 1702 of the housing 1502 via the second opening 1806. The housing 1502 of FIGS. 15-18 further includes an example third opening 1808 formed in and extending through the bottom wall 1604 of the housing 1502. The third opening 1808 is configured to allow air generated by the fan 1510 to be drawn and/or propelled into the housing 1502.

The auger tube 1504 of the engine assembly 1500 of FIGS. 15-18 is configured to extend from a hopper of the pellet grill, into the housing 1502 of the engine assembly 1500 (e.g., via the second opening 1806 formed in the right sidewall 1602 of the housing 1502), and to the burn pot 1100 of the engine assembly 1500. In the illustrated example of FIGS. 15-18, the auger tube 1504 includes a first end, a second end located opposite the first end, and a sidewall extending between the first end and the second end. The first and second ends of the auger tube 1504 are open. The first end of the auger tube 1504 extends into the combustion chamber 1402 of the burn pot 1100 via the first opening 1108 formed in the sidewall 1106 of the burn pot 1100. The second end of the auger tube 1504 is configured to be positioned against a mounting plate of a pellet grill. The auger tube 1504 of FIGS. 15-18 further includes an opening formed in and extending through the sidewall of the auger tube 1504, with said opening being configured to receive pellet fuel (e.g., combustible wood pellets) from a hopper of a pellet grill, as further described herein.

The auger 1506 of the engine assembly 1500 of FIGS. 15-18 is located within and/or circumscribed by the auger tube 1504 if the engine assembly 1500. In the illustrated example of FIGS. 15-18, the auger 1506 includes a first end, a second end located opposite the first end, a shaft extending between the first and second ends, and a flighting extending along and projecting in a radially outward direction away from the shaft. The first end of the auger 1506 terminates at or adjacent the first end of the auger tube 1504. The second end of the auger 1506 is configured to extend to and/or through a mounting plate of a pellet grill, and/or to extend to an output shaft of the auger motor 1508. The auger 1506 of FIGS. 15-18 is configured to engage with pellet fuel received (e.g., via the opening formed in the sidewall of the auger tube 1504) from a hopper of a pellet grill, and to transport the received pellet fuel away from the second end of the auger tube 1504 (e.g., away from the second end of the auger 1506), toward the first end of the auger tube 1504 (e.g., toward the first end of the auger 1506), and/or into the burn pot 1100. The auger 1506 of FIGS. 15-18 is further configured to be driven (e.g., rotated) in a controlled manner by the auger motor 1508, thereby controlling the rate at which pellet fuel is transported by the auger 1506, through the auger tube 1504, from a hopper of a pellet grill to the burn pot 1100 of the pellet grill. In some examples, the auger motor 1508 is configured as a DC-powered variable rate electric motor.

The ignitor 1802 of the engine assembly 1500 of FIGS. 15-18 is located below the auger tube 1504 of the engine assembly 1500. In the illustrated example of FIGS. 15-18, the ignitor 1802 includes a first end, a second end located opposite the first end, and a shaft extending between the first and second ends. The first end of the ignitor 1802 extends forward of and/or past the first end of the auger tube 1504 and/or the first end of the auger 1506. The first end and/or the shaft of the ignitor 1802 extends into the combustion chamber 1402 of the burn pot 1100 via the second opening 1110 formed in the sidewall 1106 of the burn pot 1100. The ignitor 1802 of FIGS. 15-18 is configured to ignite pellet fuel (e.g., combustible wood pellets) located within the combustion chamber 1402 of the burn pot 1100. In some examples, the ignitor 1802 is configured as a DC-powered glow plug.

The fan 1510 of the engine assembly 1500 of FIGS. 15-18 is coupled to an external surface (e.g., a bottom surface) of the housing 1502. The fan 1510 of FIGS. 15-18 is configured to draw and/or propel air into the housing 1502 (e.g., via the third opening 1808 formed in the bottom wall 1604 of the housing 1502), and to generate an airflow that moves from within the housing 1502 toward and/or into the burn pot 1100, thereby controlling the rate at which pellet fuel is combusted within the burn pot 1100. In some examples, the fan 1510 is configured as a DC-powered variable rate electric fan.

In the illustrated example of FIGS. 15-18, the heat diffuser 100 is positioned above the burn pot 1100 and above and/or on the housing 1502 of the engine assembly 1500. When the heat diffuser 100 is positioned relative to the burn pot 1100 and/or relative to the housing 1502 as shown in FIGS. 15-18, the bottom wall 114 of the outer frame 102 of the heat diffuser 100 contacts, abuts, and/or is adjacent to the top wall 1516 of the housing 1502. The open upper end 1102 of the burn pot 1100 is aligned with (e.g., concentrically and/or coaxially aligned with) and/or otherwise is in fluid communication with the first opening 1804 formed in the top wall 1516 of the housing 1502, the first intake opening 902 formed in the bottom wall 114 of the outer frame 102 of the heat diffuser 100, and the second intake opening 904 located along the lower end 206 of the inner frame 202 of the heat diffuser 100. The first positioning flange 118 of the heat diffuser 100 contacts, abuts, and/or is adjacent to the front wall 1512 of the housing 1502. The second positioning flange 502 of the heat diffuser 100 contacts, abuts, and/or is adjacent to the rear wall 1702 of the housing 1502. The third positioning flange 120 of the heat diffuser 100 contacts, abuts, and/or is adjacent to the left sidewall 1514 of the housing 1502.

The housing 1502 of FIGS. 15-18 further includes a plurality of example alignment tabs 1518 coupled to or integrally formed with the housing 1502, with a first one of the alignment tabs 1518 being located along the front wall 1512 of the housing 1502 adjacent the top wall 1516 of the housing 1502, and with a second one of the alignment tabs 1518 being located along the rear wall 1702 of the housing 1502 adjacent the top wall 1516 of the housing. In the illustrated example of FIGS. 15-18, the first alignment notch 122 of the first positioning flange 118 of the heat diffuser 100 receives, engages, and/or otherwise mates with the first one of the alignment tabs 1518 of the housing 1502, and the second alignment notch 504 of the second positioning flange 502 of the heat diffuser 100 receives, engages, and/or otherwise mates with the second one of the alignment tabs 1518 of the housing 1502. The respective engagements between the first and second ones of the alignment tabs 1518 of the housing 1502 on the one hand and the corresponding first and second ones of the alignment notches 122, 504 of the heat diffuser 100 on the other hand securely positions the heat diffuser 100 relative to the burn pot 1100 and/or relative to the housing 1502 of the engine assembly 1500.

Figure 19:
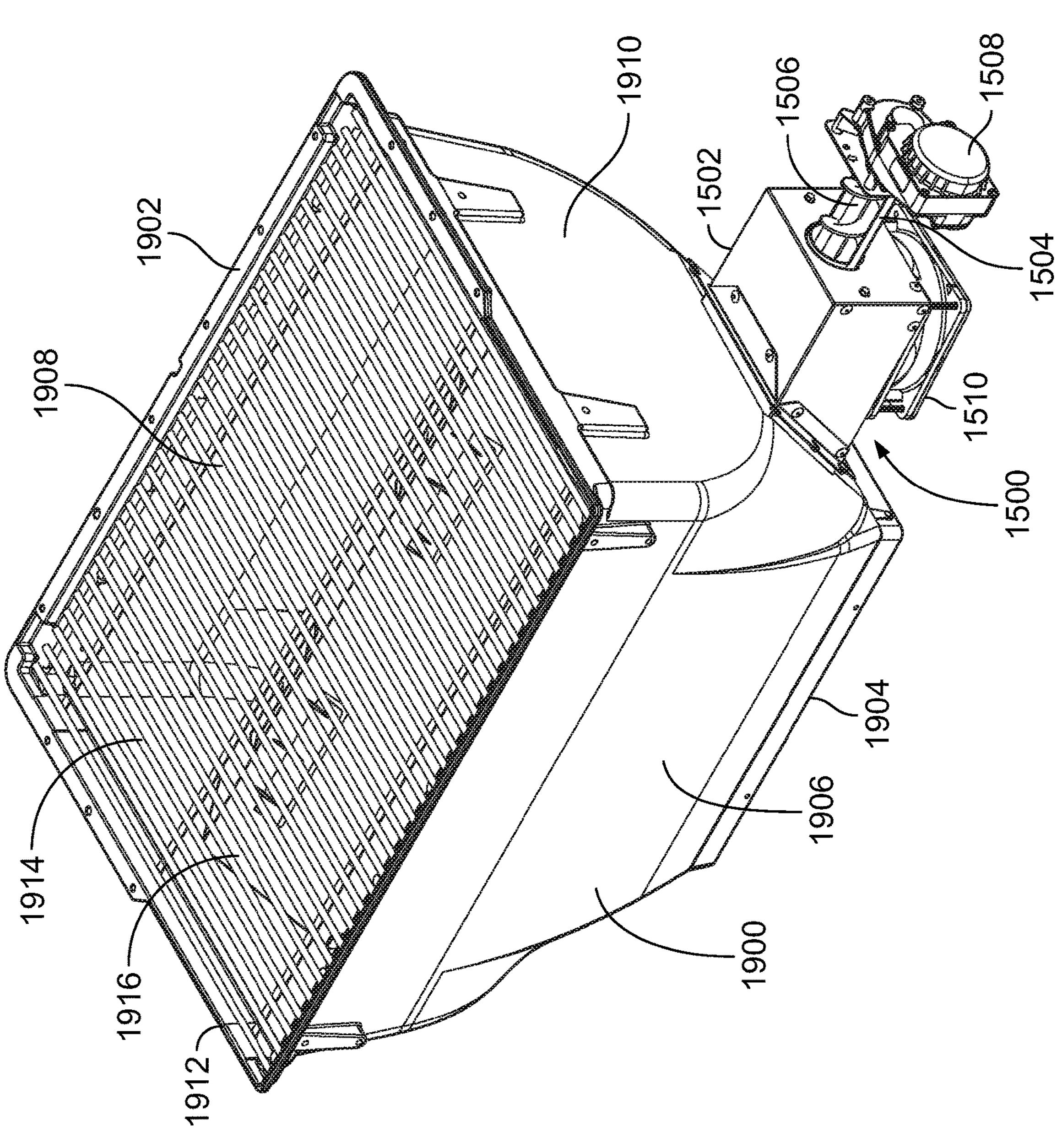
FIG. 19 is a perspective view of an example cookbox including the engine assembly of FIGS. 15-18.
Figure 20:
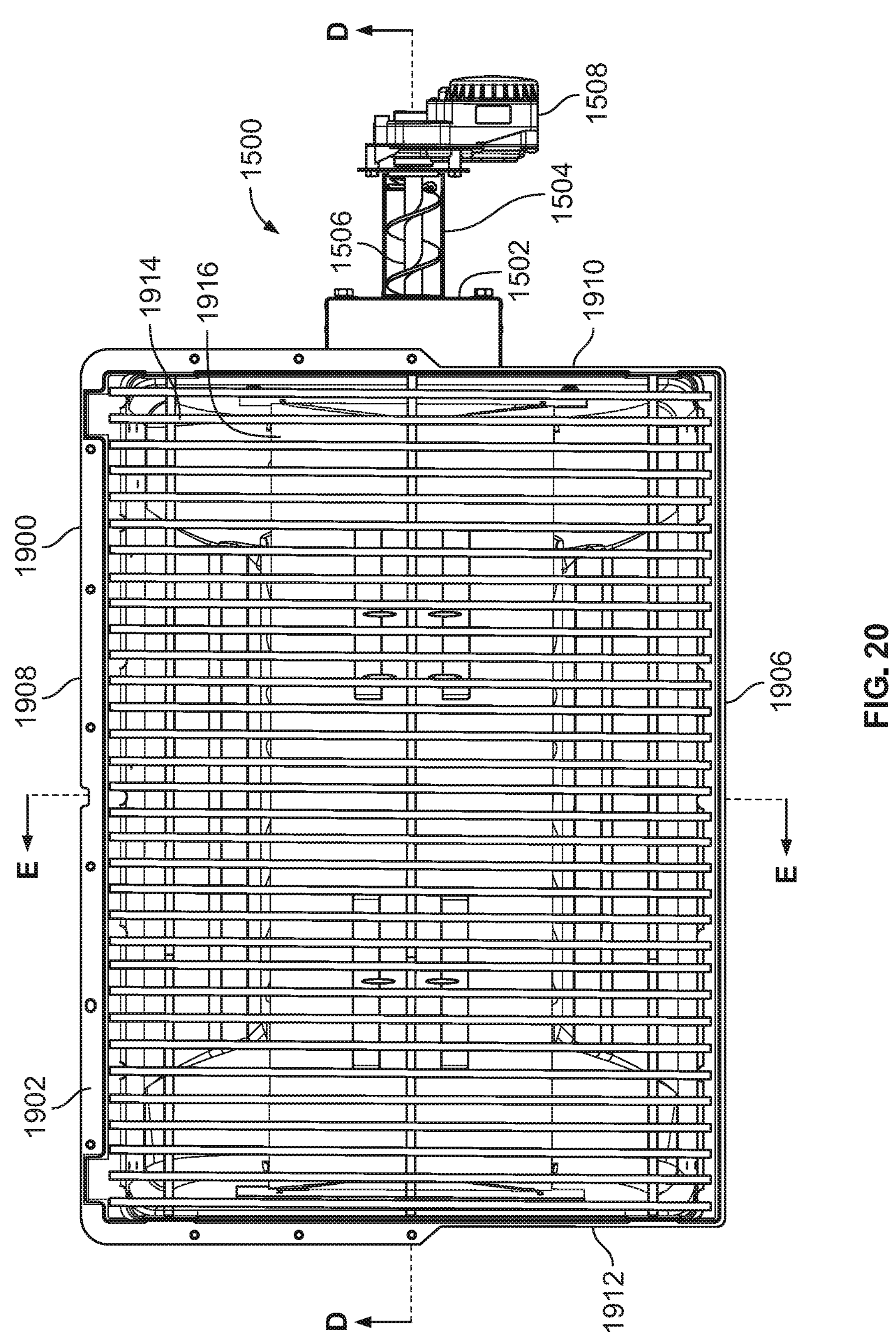
FIG. 20 is a top view of the cookbox and the engine assembly of FIG. 19.
Figure 21:
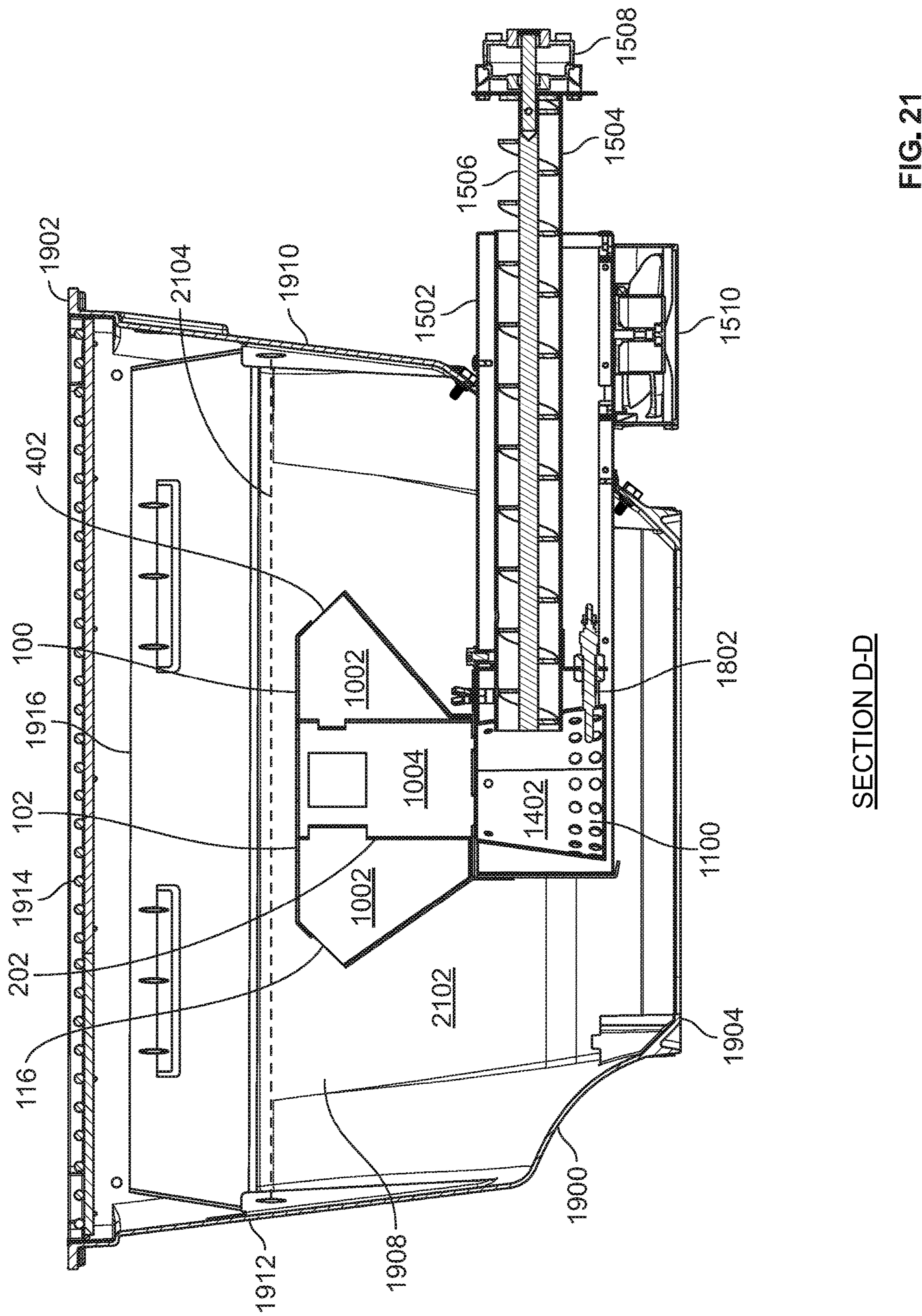
FIG. 21 is a cross-sectional view of the cookbox and the engine assembly of FIGS. 19 and 20 taken along section D-D of FIG. 20.
Figure 22:
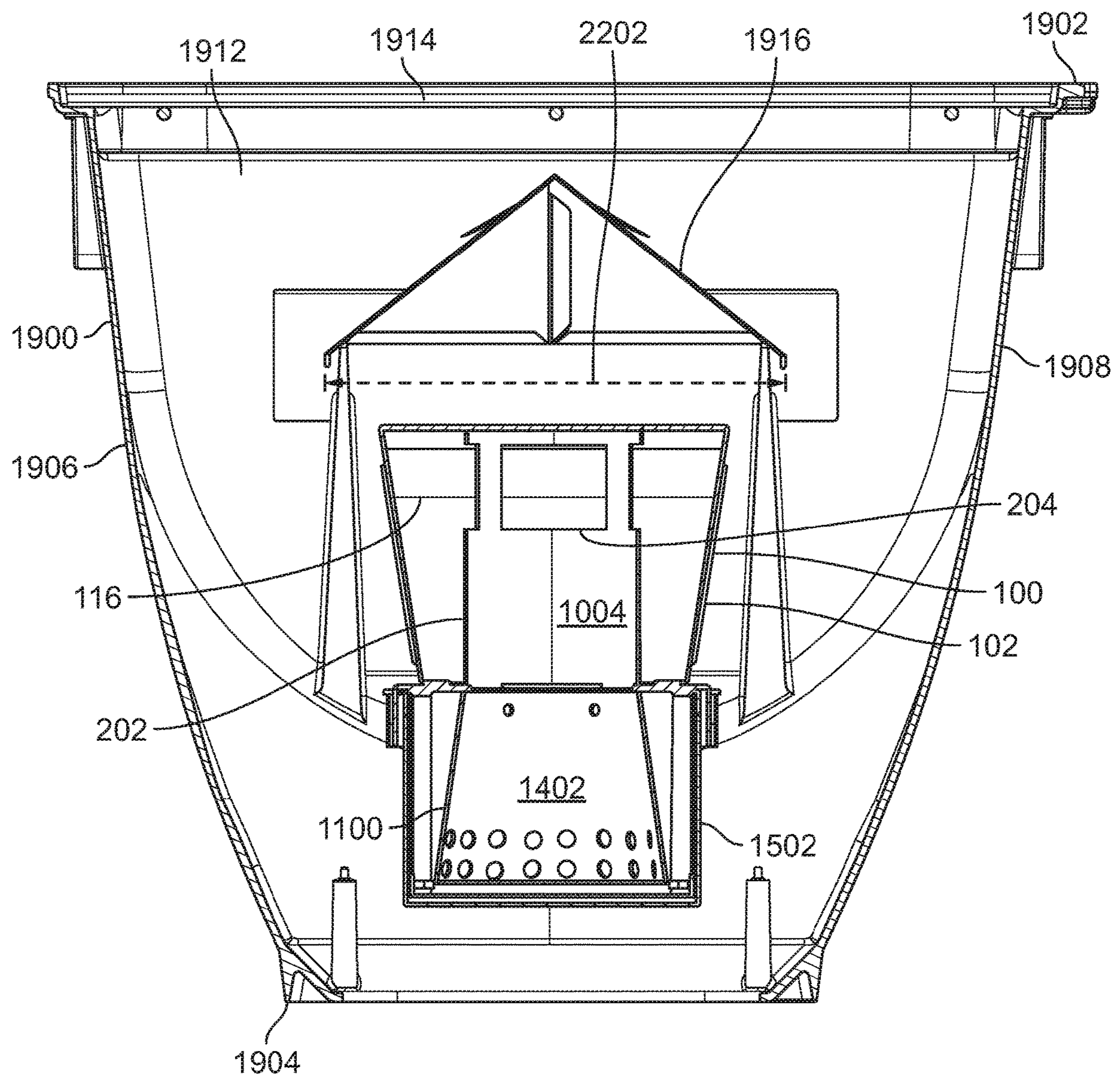
FIG. 22 is a cross-sectional view of the cookbox and the engine assembly of FIGS. 19-21 taken along section E-E of FIG. 20.

FIG. 19 is a perspective view of an example cookbox 1900 including the engine assembly 1500 of FIGS. 15-18. FIG. 20 is a top view of the cookbox 1900 and the engine assembly 1500 of FIG. 19. FIG. 21 is a cross-sectional view of the cookbox 1900 and the engine assembly 1500 of FIGS. 19 and 20 taken along section D-D of FIG. 20. FIG. 22 is a cross-sectional view of the cookbox 1900 and the engine assembly 1500 of FIGS. 19-21 taken along section E-E of FIG. 20.

The cookbox 1900 of FIGS. 19-22 contains, houses, carries, and/or supports at least a portion of the heat diffuser 100, at least a portion of the burn pot 1100, at least a portion of the housing 1502, at least a portion of the auger tube 1504, at least a portion of the auger 1506, and at least a portion of the ignitor 1802. For example, as shown in FIGS. 19-22, the heat diffuser 100, the burn pot 1100, and the ignitor 1802 are all located within the cookbox 1900, as are portions of the housing 1502, the auger tube 1504, and the auger 1506. In the illustrated example of FIGS. 19-22, the cookbox 1900 includes an example upper end 1902, an example lower end 1904, an example front wall 1906, an example rear wall 1908, an example right sidewall 1910, and an example left sidewall 1912. The lower end 1904 of the cookbox 1900 is located opposite the upper end 1902 of the cookbox 1900. The front wall 1906, the rear wall 1908, the right sidewall 1910, and the left sidewall 1912 of the cookbox respectively extend between the upper end 1902 and the lower end 1904 of the cookbox 1900. In the illustrated example of FIGS. 19-22, the upper end 1902 and the lower end 1904 of the cookbox 1900 are both open. In other examples, the lower end 1904 of the cookbox 1900 can instead be closed. The upper end 1902, the lower end 1904, the front wall 1906, the rear wall 1908, the right sidewall 1910, and the left sidewall 1912 collectively define an example cooking chamber 2102 of the cookbox 1900, with the cooking chamber 2102 being configured to cook one or more item(s) of food located therein.

In the illustrated example of FIGS. 19-22, the combustion chamber 1402 of the burn pot 1100, the inner chamber 1004 of the inner frame 202 of the heat diffuser 100, and the outer chamber 1002 of the outer frame 102 of the heat diffuser 100 are respectively located within the cooking chamber 2102 of the cookbox 1900, with the combustion chamber 1402 of the burn pot 1100 being positioned directly below the inner chamber 1004 of the inner frame 202 of the heat diffuser 100, and with the inner chamber 1004 of the inner frame 202 of the heat diffuser 100 being located within (e.g., surrounded by) the outer chamber 1002 of the outer frame 102 of the heat diffuser 100. The aforementioned configuration causes heat generated within the combustion chamber 1402 of the burn pot 1100 to flow upward from the combustion chamber 1402 of the burn pot 1100 into the inner chamber 1004 of the inner frame 202 of the heat diffuser 100 (e.g., via the open upper end 1102 of the burn pot 1100, the first opening 1804 of the housing 1502, the first intake opening 902 of the outer frame 102, and the second intake opening 904 of the inner frame 202), to flow from the inner chamber 1004 of the inner frame 202 of the heat diffuser 100 into the outer chamber 1002 of the outer frame 102 of the heat diffuser 100 (e.g., via the first heat distribution opening 210, the second heat distribution opening 212, the third heat distribution opening 214, and the fourth heat distribution opening 216), and to flow from the outer chamber 1002 of the outer frame 102 of the heat diffuser 100 into the cooking chamber 2102 of the cookbox 1900 (e.g., via the first exhaust opening 402 and the second exhaust opening 116).

The cookbox 1900 of FIGS. 19-22 further includes an example cooking grate 1914 located within the cooking chamber 2102 above the burn pot 1100 and above the heat diffuser 100. In the illustrated example of FIGS. 19-22, the cooking grate 1914 is located adjacent and/or proximate to the upper end 1902 of the cookbox 1900. The cooking grate 1914 is configured to support one or more item(s) of food within the cooking chamber 2102 of the cookbox 1900 as the item(s) of food is/are being cooked. The cookbox 1900 of FIGS. 19-22 further includes an example grease deflector 1916 located within the cooking chamber 2102 above the burn pot 1100 and above the heat diffuser 100, but below the cooking grate 1914. The grease deflector 1916 is configured to receive grease drippings from one or more item(s) of food being cooked on the cooking grate 1914, and to deflect and/or direct the received grease drippings further downward into the cooking chamber 2102 of the cookbox 1900 (e.g., toward and/or to the lower end 1904 of the cookbox 1900) without the grease drippings falling onto and/or into the heat diffuser 100, the burn pot 1100, and/or the housing 1502 of the engine assembly 1500. In the illustrated example of FIGS. 19-22, the grease deflector 1916 has an inverted V-shaped cross-sectional profile defined by a central apex and a pair of sloped walls extending at a downward angle from the central apex. In other examples, the grease deflector 1916 can instead have a different cross-sectional profile.

The grease deflector 1916 of FIGS. 19-22 has an example lengthwise span 2104 extending in a right-to-left direction within the cooking chamber 2102 of the cookbox 1900, and an example widthwise span 2202 extending in a front-to-rear direction within the cooking chamber 2102 of the cookbox 1900. In the illustrated example of FIGS. 19-22, the lengthwise span 2104 of the grease deflector 1916 exceeds a lengthwise span of the heat diffuser 100, and the widthwise span 2202 of the grease deflector 1916 exceeds a widthwise span of the heat diffuser 100. The lengthwise span 2104 and the widthwise span 2202 of the grease deflector 1916 further exceed a corresponding lengthwise span and a corresponding widthwise span of the burn pot 1100, as well as a corresponding lengthwise span and a corresponding widthwise span of the portion of the housing 1502 that is located within the cooking chamber 2102 of the cookbox 1900. The aforementioned configurations and/or arrangements advantageously prevent grease drippings from falling onto and/or into the heat diffuser 100, the burn pot 1100, and/or the housing 1502 of the engine assembly 1500 as such grease drippings are deflected and/or directed downward from the grease deflector 1916 toward and/or to the lower end 1904 of the cookbox 1900.

Figure 23:
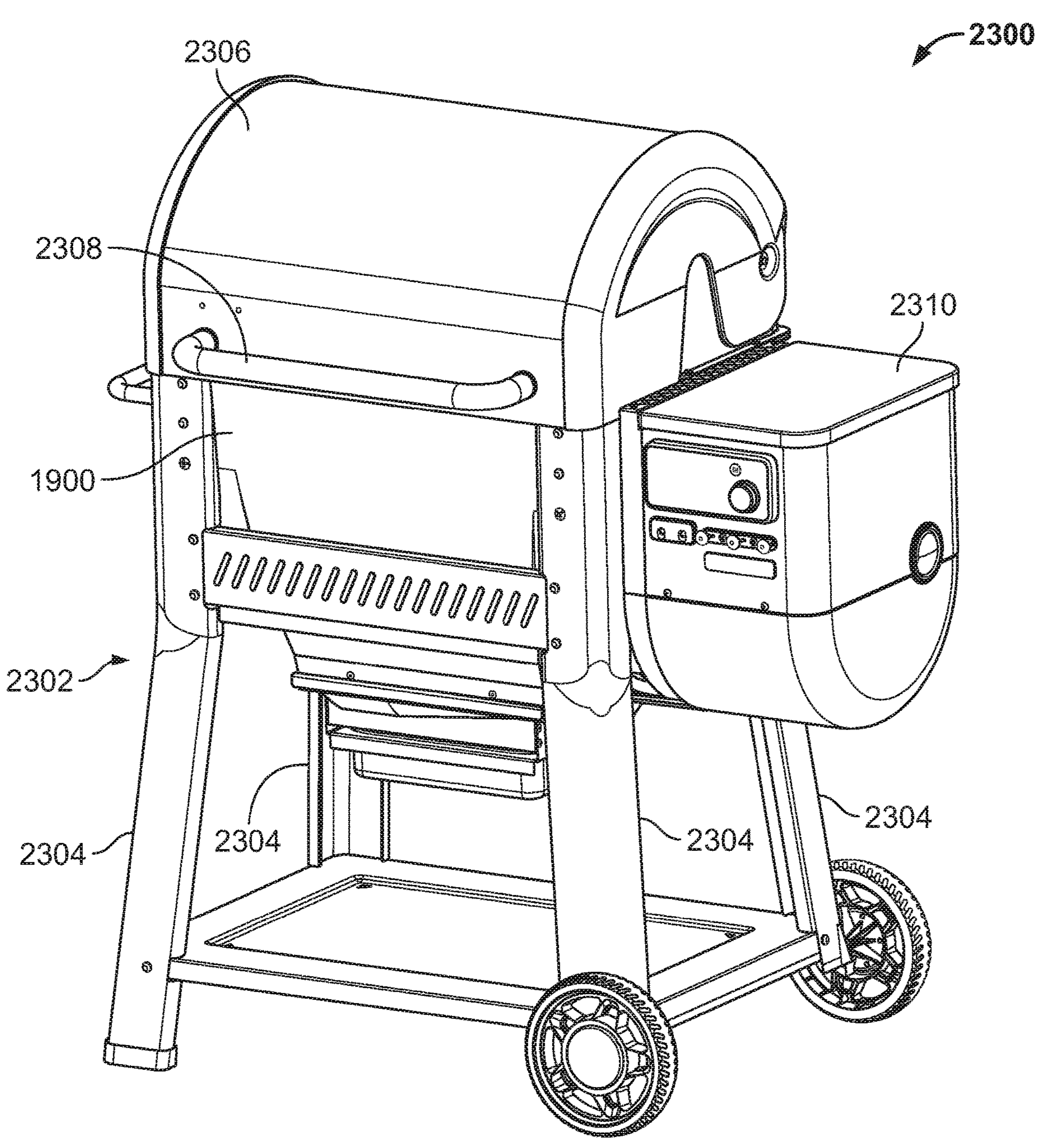
FIG. 23 is a perspective view of an example pellet grill including the cookbox and the engine assembly of FIGS. 19-22.
Figure 24:
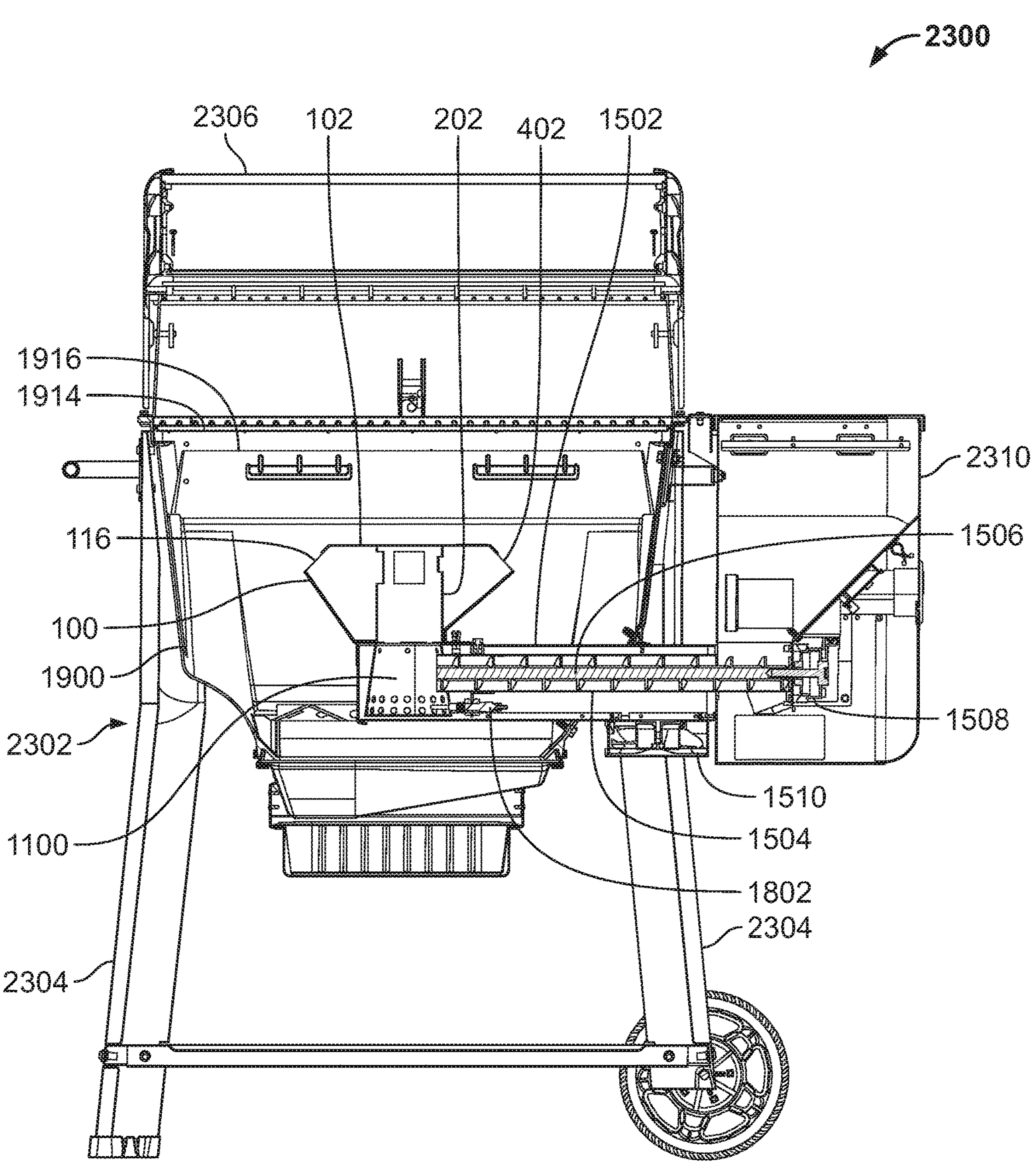
FIG. 24 is a partial cutaway view of the pellet grill of FIG. 23.

FIG. 23 is a perspective view of an example pellet grill 2300 including the cookbox 1900 and the engine assembly 1500 of FIGS. 19-22. FIG. 24 is a partial cutaway view of the pellet grill 2300 of FIG. 23. In addition to including the cookbox 1900 and the engine assembly 1500, the pellet grill 2300 of FIGS. 23 and 24 further includes an example frame 2302. In the illustrated example of FIGS. 23 and 24, the frame 2302 includes one or more example support member(s) 2304 (e.g., one or more vertically oriented leg(s)) that are configured to support the cookbox 1900 above an underlying ground surface. The support member(s) 2304 and/or, more generally, the frame 2302 can be configured from any number and any type of structural components arranged in any manner that facilitates supporting the cookbox 1900 above an underlying ground surface when the pellet grill 2300 is in use. For example, while each of the one or more support member(s) 2304 shown in FIGS. 23 and 24 is fixed relative to the cookbox 1900, in other examples the frame 2302 can include one or more foldable, slidable, and/or telescoping support member(s) 2304 that facilitate collapsing and/or otherwise modifying the frame 2302 of the pellet grill 2300 when the pellet grill 2300 is not in use. The pellet grill 2300 of FIGS. 23 and 24 can further include one or more side table(s) coupled to the frame 2302 and/or to the cookbox 1900 of the pellet grill 2300.

The pellet grill 2300 of FIGS. 23 and 24 further includes an example lid 2306 configured to cover and/or enclose the cookbox 1900 of the pellet grill 2300 when the lid 2306 is in a closed position. The lid 2306 is movable relative to the cookbox 1900 between a closed position and an open position in which a cooking surface (e.g., the cooking grate 1914) located on or within the cookbox 1900 is exposed. In the illustrated example of FIGS. 23 and 24, the lid 2306 is pivotally coupled to the cookbox 1900 via one or more hinge(s) and/or pivot(s) that mechanically couple the lid 2306 to the cookbox 1900. Movement of the lid 2306 of the pellet grill 2300 between the closed position and the open position can be facilitated via user interaction with an example handle 2308 that is coupled to the lid 2306.

The pellet grill 2300 of FIGS. 23 and 24 further includes an example hopper 2310 coupled to the cookbox 1900 and/or to the frame 2302, with the hopper 2310 being configured to hold and/or contain a supply of combustible wood pellets (e.g., pellet fuel). During operation of the pellet grill 2300, the combustible wood pellets pass from the hopper 2310 into the auger tube 1504 via the opening formed in the sidewall of the auger tube 1504. Combustible wood pellets received in the auger tube 1504 from the hopper 2310 are thereafter transported through the auger tube 1504 toward and/or into the burn pot 1100 via rotation of the auger 1506 (e.g., as driven by the auger motor 1508). Combustion of the wood pellets received in the burn pot 1100 can be initiated via activation of the ignitor 1802. In this regard, the first end of the ignitor 1802 extends into the burn pot 1100 such that a heat-generating portion of the ignitor 1802 contacts at least some of the wood pellets received in the burn pot 1100. Once combustion of the wood pellets received in the burn pot 1100 has commenced via the ignition process, the rate of such combustion can be managed via a controlled airflow generated by the fan 1510, with said airflow being delivered from the fan 1510 into the housing 1502, and through the housing 1502 to the burn pot 1100.

The following paragraphs provide various examples in relation to the disclosed pellet grills including heat diffusers configured for optimum heat distribution.

Example 1 includes a heat diffuser configured to be positioned over a burn pot of a pellet grill. In Example 1, the heat diffuser includes a front wall, a rear wall, a top wall, a bottom wall, a right sidewall, a left sidewall, a first intake opening, a first exhaust opening, and a second exhaust opening. The rear wall is located opposite the front wall. The top wall extends between the front wall and the rear wall. The bottom wall is located opposite the top wall, and extends between the front wall and the rear wall. The bottom wall includes the first intake opening. The right sidewall extends upwardly from the bottom wall toward the top wall, and extends between the front wall and the rear wall. The left sidewall is located opposite the right sidewall, extends upwardly from the bottom wall toward the top wall, and extends between the front wall and the rear wall. The first exhaust opening is located between the front wall and the rear wall and between the top wall and the right sidewall. The second exhaust opening is located between the front wall and the rear wall and between the top wall and the left sidewall.

Example 2 includes the heat diffuser of Example 1. In Example 2, the front wall, the rear wall, the top wall, the bottom wall, the right sidewall, the left sidewall, the first intake opening, the first exhaust opening, and the second exhaust opening define an outer frame having an outer chamber. In Example 2, the first intake opening is configured to receive a flow of heat generated by and emitted from the burn pot, the flow of heat to pass through the first intake opening and to progress into the outer chamber. In Example 2, the first exhaust opening is configured to exhaust a first portion of the flow of heat out of the outer chamber in a first direction, and the second exhaust opening is configured to exhaust a second portion of the flow of heat out of the outer chamber in a second direction that differs from the first direction.

Example 3 includes the heat diffuser of Example 2. In Example 3, the first direction extends outwardly from the right sidewall, and the second direction extends outwardly from the left sidewall.

Example 4 includes the heat diffuser of Example 1. In Example 4, the first exhaust opening and the second exhaust opening respectively have a rectangular shape.

Example 5 includes the heat diffuser of Example 1. In Example 5, the right sidewall tapers outwardly from and is oriented at a first angle relative to the bottom wall, and the left sidewall tapers outwardly from and is oriented at a second angle relative to the bottom wall. In Example 5, the first angle and the second angle are respectively between twenty and seventy degrees.

Example 6 includes the heat diffuser of Example 5. In Example 6, the first angle is approximately forty degrees, and the second angle is approximately fifty-five degrees.

Example 7 includes the heat diffuser of Example 5. In Example 7, the first exhaust opening is oriented at a third angle relative to the top wall, and the second exhaust opening is oriented at a fourth angle relative to the top wall. In Example 7, the third angle and the fourth angle are respectively between twenty and seventy degrees.

Example 8 includes the heat diffuser of Example 7. In Example 8, the third angle is approximately forty-five degrees, and the fourth angle is approximately forty-five degrees.

Example 9 includes the heat diffuser of Example 1. In Example 8, the front wall, the rear wall, the top wall, the bottom wall, the right sidewall, the left sidewall, the first intake opening, the first exhaust opening, and the second exhaust opening define an outer frame having an outer chamber. In Example 8, the heat diffuser further includes an inner frame located within the outer frame, the inner frame having an inner chamber located within the outer chamber. In Example 8, the inner frame includes an upper end, a lower end, a sidewall, a second intake opening, a first heat distribution opening, and a second heat distribution opening. The upper end is located adjacent the top wall. The lower end is located opposite the upper end and adjacent the bottom wall. The lower end includes the second intake opening. The second intake opening of the lower end is aligned with the first intake opening of the bottom wall. The sidewall extends between the upper end and the lower end. The first heat distribution opening is formed in the sidewall of the inner frame and oriented toward the right sidewall of the outer frame. The second heat distribution opening is formed in the sidewall of the inner frame and oriented toward the left sidewall of the outer frame.

Example 10 includes the heat diffuser of Example 9. In Example 10, the second intake opening is configured to receive a flow of heat generated by and emitted from the burn pot, the flow of heat to pass through the second intake opening into the inner chamber. In Example 10, the first heat distribution opening is configured to distribute a first portion of the flow of heat from the inner chamber into the outer chamber in a first direction oriented toward the first exhaust opening, and the second heat distribution opening is configured to distribute a second portion of the flow of heat from the inner chamber into the outer chamber in a second direction oriented toward the second exhaust opening.

Example 11 includes the heat diffuser of Example 9. In Example 11, the sidewall has a cylindrical shape.

Example 12 includes the heat diffuser of Example 9. In Example 12, the first heat distribution opening is smaller than the second heat distribution opening.

Example 13 includes the heat diffuser of Example 9. In Example 13, the first heat distribution and the second heat distribution opening respectively have a rectangular shape.

Example 14 includes the heat diffuser of Example 9. In Example 14, the inner frame further includes a third heat distribution opening formed in the sidewall and oriented toward the front wall, and a fourth heat distribution opening formed in the sidewall and oriented toward the rear wall.

Example 15 includes the heat diffuser of Example 1. In Example 15, the heat diffuser further includes a plurality of positioning flanges extending downwardly from the bottom wall. In Example 15, at least one of the plurality of positioning flanges includes an alignment notch configured to receive an alignment tab to align the heat diffuser relative to the burn pot.

Example 16 includes a pellet grill. In Example 16, the pellet grill includes a cookbox, a cooking grate, a grease deflector, a housing, a burn pot, and a heat diffuser. The cookbox includes an upper end and a lower end. The cooking grate is located within the cookbox between the upper end and the lower end. The grease deflector is located within the cookbox between the upper end and the lower end, and below the cooking grate. The housing is located within the cookbox between the upper end and the lower end, and below the grease deflector. The housing contains the burn pot. The burn pot is configured to generate and to emit a flow of heat. The heat diffuser is located within the cookbox between the upper end and the lower end, below the grease deflector and above the burn pot. The heat diffuser is positioned on the housing. In Example 16, the heat diffuser includes a front wall, a rear wall, a top wall, a bottom wall, a right sidewall, a left sidewall, a first intake opening, a first exhaust opening, and a second exhaust opening. The rear wall is located opposite the front wall. The top wall extends between the front wall and the rear wall. The bottom wall is located opposite the top wall, and extends between the front wall and the rear wall. The bottom wall includes the first intake opening. The right sidewall extends upwardly from the bottom wall toward the top wall, and extends between the front wall and the rear wall. The left sidewall is located opposite the right sidewall, extends upwardly from the bottom wall toward the top wall, and extends between the front wall and the rear wall. The first exhaust opening is located between the front wall and the rear wall and between the top wall and the right sidewall. The second exhaust opening is located between the front wall and the rear wall and between the top wall and the left sidewall.

Example 17 includes the pellet grill of Example 16. In Example 17, the front wall, the rear wall, the top wall, the bottom wall, the right sidewall, the left sidewall, the first intake opening, the first exhaust opening, and the second exhaust opening define an outer frame of the heat diffuser. The outer frame defines an outer chamber. In Example 17, the first intake opening is configured to receive the flow of heat generated by and emitted from the burn pot, the flow of heat to pass through the first intake opening and to progress into the outer chamber. In Example 17, the first exhaust opening is configured to exhaust a first portion of the flow of heat out of the outer chamber in a first direction extending outwardly from the right sidewall and upwardly toward the grease deflector, and the second exhaust opening is configured to exhaust a second portion of the flow of heat out of the outer chamber in a second direction extending outwardly from the left sidewall and upwardly toward the grease deflector.

Example 18 includes the pellet grill of Example 16. In Example 18, the front wall, the rear wall, the top wall, the bottom wall, the right sidewall, the left sidewall, the first intake opening, the first exhaust opening, and the second exhaust opening define an outer frame of the heat diffuser. The outer frame defines an outer chamber. In Example 18, the heat diffuser further includes an inner frame located within the outer frame. The inner frame defines an inner chamber located within the outer chamber. In Example 18, the inner frame includes an upper end, a lower end, a sidewall, a second intake opening, a first heat distribution opening, and a second heat distribution opening. The upper end is located adjacent the top wall. The lower end is located opposite the upper end and adjacent the bottom wall. The lower end includes the second intake opening. The second intake opening of the lower end is aligned with the first intake opening of the bottom wall. The sidewall extends between the upper end and the lower end. The first heat distribution opening is formed in the sidewall of the inner frame and oriented toward the right sidewall of the outer frame. The second heat distribution opening is formed in the sidewall of the inner frame and oriented toward the left sidewall of the outer frame.

Example 19 includes the pellet grill of Example 18. In Example 19, the second intake opening is configured to receive the flow of heat generated by and emitted from the burn pot, the flow of heat to pass through the second intake opening into the inner chamber. In Example 19, the first heat distribution opening is configured to distribute a first portion of the flow of heat from the inner chamber into the outer chamber in a first direction oriented toward the first exhaust opening, and the second heat distribution opening is configured to distribute a second portion of the flow of heat from the inner chamber into the outer chamber in a second direction oriented toward the second exhaust opening.

Example 20 includes the pellet grill of Example 16. In Example 20, the grease deflector has an inverted V-shaped cross-sectional profile. In Example 20, the grease deflector has a lengthwise span and a widthwise span. The lengthwise span of the grease deflector exceeds a lengthwise span of the heat diffuser, and the widthwise span of the grease deflector exceeds a widthwise span of the heat diffuser.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A heat diffuser configured to be positioned over a burn pot of a pellet grill, the heat diffuser comprising:

a front wall;

a rear wall located opposite the front wall;

a top wall extending between the front wall and the rear wall;

a bottom wall located opposite the top wall, the bottom wall extending between the front wall and the rear wall, the bottom wall including a first intake opening;

a right sidewall extending upwardly from the bottom wall toward the top wall, the right sidewall extending between the front wall and the rear wall, the right sidewall tapering outwardly from and oriented at a first angle relative to the bottom wall, wherein the first angle is between twenty and seventy degrees;

a left sidewall located opposite the right sidewall, the left sidewall extending upwardly from the bottom wall toward the top wall, the left sidewall extending between the front wall and the rear wall, the left sidewall tapering outwardly from and oriented at a second angle relative to the bottom wall, wherein the second angle is between twenty and seventy degrees;

a first exhaust opening located between the front wall and the rear wall and between the top wall and the right sidewall, the first exhaust opening being oriented at a third angle relative to the top wall, wherein the third angle is between twenty and seventy degrees; and a second exhaust opening located between the front wall and the rear wall and between the top wall and the left sidewall, the second exhaust opening being oriented at a fourth angle relative to the top wall, wherein the fourth angle is between twenty and seventy degrees.

2. The heat diffuser of claim 1, wherein the front wall, the rear wall, the top wall, the bottom wall, the right sidewall, the left sidewall, the first intake opening, the first exhaust opening, and the second exhaust opening define an outer frame having an outer chamber, wherein the first intake opening is configured to receive a flow of heat generated by and emitted from the burn pot, the flow of heat to pass through the first intake opening and to progress into the outer chamber, wherein the first exhaust opening is configured to exhaust a first portion of the flow of heat out of the outer chamber in a first direction, and wherein the second exhaust opening is configured to exhaust a second portion of the flow of heat out of the outer chamber in a second direction that differs from the first direction.

3. The heat diffuser of claim 2, wherein the first direction extends outwardly from the right sidewall, and the second direction extends outwardly from the left sidewall.

4. The heat diffuser of claim 1, wherein the first exhaust opening and the second exhaust opening respectively have a rectangular shape.

5. The heat diffuser of claim 1, wherein the first angle is approximately forty degrees, and the second angle is approximately fifty-five degrees.

6. The heat diffuser of claim 1, wherein the third angle is approximately forty-five degrees, and the fourth angle is approximately forty-five degrees.

7. The heat diffuser of claim 1, wherein the front wall, the rear wall, the top wall, the bottom wall, the right sidewall, the left sidewall, the first intake opening, the first exhaust opening, and the second exhaust opening define an outer frame having an outer chamber, the heat diffuser further comprising an inner frame located within the outer frame, the inner frame having an inner chamber located within the outer chamber, the inner frame including:

an upper end located adjacent the top wall;

a lower end located opposite the upper end, the lower end located adjacent the bottom wall, the lower end including a second intake opening aligned with the first intake opening of the bottom wall;

a sidewall extending between the upper end and the lower end;

a first heat distribution opening formed in the sidewall of the inner frame and oriented toward the right sidewall of the outer frame; and a second heat distribution opening formed in the sidewall of the inner frame and oriented toward the left sidewall of the outer frame.

8. The heat diffuser of claim 7, wherein the second intake opening is configured to receive a flow of heat generated by and emitted from the burn pot, the flow of heat to pass through the second intake opening into the inner chamber, wherein the first heat distribution opening is configured to distribute a first portion of the flow of heat from the inner chamber into the outer chamber in a first direction oriented toward the first exhaust opening, and wherein the second heat distribution opening is configured to distribute a second portion of the flow of heat from the inner chamber into the outer chamber in a second direction oriented toward the second exhaust opening.

9. The heat diffuser of claim 7, wherein the sidewall has a cylindrical shape.

10. The heat diffuser of claim 7, wherein the first heat distribution opening is smaller than the second heat distribution opening.

11. The heat diffuser of claim 7, wherein the first heat distribution and the second heat distribution opening respectively have a rectangular shape.

12. The heat diffuser of claim 7, wherein the inner frame further includes a third heat distribution opening formed in the sidewall and oriented toward the front wall, and a fourth heat distribution opening formed in the sidewall and oriented toward the rear wall.

13. The heat diffuser of claim 1, further comprising a plurality of positioning flanges extending downwardly from the bottom wall, wherein at least one of the plurality of positioning flanges includes an alignment notch, the alignment notch configured to receive an alignment tab to align the heat diffuser relative to the burn pot.

14. A pellet grill, comprising:

a cookbox including an upper end and a lower end;

a cooking grate located within the cookbox between the upper end and the lower end;

a grease deflector located within the cookbox between the upper end and the lower end, the grease deflector located below the cooking grate;

a housing located within the cookbox between the upper end and the lower end, the housing located below the grease deflector, the housing containing a burn pot, the burn pot configured to generate and to emit a flow of heat; and a heat diffuser located within the cookbox between the upper end and the lower end, the heat diffuser located below the grease deflector and above the burn pot, the heat diffuser positioned on the housing, the heat diffuser including:

a front wall;

a rear wall located opposite the front wall;

a top wall extending between the front wall and the rear wall;

a bottom wall located opposite the top wall, the bottom wall extending between the front wall and the rear wall, the bottom wall including a first intake opening;

a right sidewall extending upwardly from the bottom wall toward the top wall, the right sidewall extending between the front wall and the rear wall, the right sidewall tapering outwardly from and oriented at a first angle relative to the bottom wall, wherein the first angle is between twenty and seventy degrees;

a left sidewall located opposite the right sidewall, the left sidewall extending upwardly from the bottom wall toward the top wall, the left sidewall extending between the front wall and the rear wall, the left sidewall tapering outwardly from and oriented at a second angle relative to the bottom wall, wherein the second angle is between twenty and seventy degrees;

a first exhaust opening located between the front wall and the rear wall and between the top wall and the right sidewall, the first exhaust opening being oriented at a third angle relative to the top wall, wherein the third angle is between twenty and seventy degrees; and a second exhaust opening located between the front wall and the rear wall and between the top wall and the left sidewall, the second exhaust opening being oriented at a fourth angle relative to the top wall, wherein the fourth angle is between twenty and seventy degrees.

15. The pellet grill of claim 14, wherein the front wall, the rear wall, the top wall, the bottom wall, the right sidewall, the left sidewall, the first intake opening, the first exhaust opening, and the second exhaust opening define an outer frame of the heat diffuser, the outer frame defining an outer chamber, wherein the first intake opening is configured to receive the flow of heat generated by and emitted from the burn pot, the flow of heat to pass through the first intake opening and to progress into the outer chamber, wherein the first exhaust opening is configured to exhaust a first portion of the flow of heat out of the outer chamber in a first direction extending outwardly from the right sidewall and upwardly toward the grease deflector, and wherein the second exhaust opening is configured to exhaust a second portion of the flow of heat out of the outer chamber in a second direction extending outwardly from the left sidewall and upwardly toward the grease deflector.

16. The pellet grill of claim 14, wherein the front wall, the rear wall, the top wall, the bottom wall, the right sidewall, the left sidewall, the first intake opening, the first exhaust opening, and the second exhaust opening define an outer frame of the heat diffuser, the outer frame defining an outer chamber, the heat diffuser further including an inner frame located within the outer frame, the inner frame defining an inner chamber located within the outer chamber, the inner frame including:

an upper end located adjacent the top wall;

a lower end located opposite the upper end, the lower end located adjacent the bottom wall, the lower end including a second intake opening aligned with the first intake opening of the bottom wall;

a sidewall extending between the upper end and the lower end;

a first heat distribution opening formed in the sidewall of the inner frame and oriented toward the right sidewall of the outer frame; and a second heat distribution opening formed in the sidewall of the inner frame and oriented toward the left sidewall of the outer frame.

17. The pellet grill of claim 16, wherein the second intake opening is configured to receive the flow of heat generated by and emitted from the burn pot, the flow of heat to pass through the second intake opening into the inner chamber, wherein the first heat distribution opening is configured to distribute a first portion of the flow of heat from the inner chamber into the outer chamber in a first direction oriented toward the first exhaust opening, and wherein the second heat distribution opening is configured to distribute a second portion of the flow of heat from the inner chamber into the outer chamber in a second direction oriented toward the second exhaust opening.

18. The pellet grill of claim 14, wherein the grease deflector has an inverted V-shaped cross-sectional profile, the grease deflector having a lengthwise span and a widthwise span, the lengthwise span of the grease deflector exceeding a lengthwise span of the heat diffuser, the widthwise span of the grease deflector exceeding a widthwise span of the heat diffuser.

19. A heat diffuser configured to be positioned over a burn pot of a pellet grill, the heat diffuser comprising:

a front wall;

a rear wall located opposite the front wall;

a top wall extending between the front wall and the rear wall;

a bottom wall located opposite the top wall, the bottom wall extending between the front wall and the rear wall, the bottom wall including a first intake opening;

a right sidewall extending upwardly from the bottom wall toward the top wall, the right sidewall extending between the front wall and the rear wall;

a left sidewall located opposite the right sidewall, the left sidewall extending upwardly from the bottom wall toward the top wall, the left sidewall extending between the front wall and the rear wall;

a first exhaust opening located between the front wall and the rear wall and between the top wall and the right sidewall;

a second exhaust opening located between the front wall and the rear wall and between the top wall and the left sidewall;

an outer frame defined by the front wall, the rear wall, the top wall, the bottom wall, the right sidewall, the left sidewall, the first intake opening, the first exhaust opening, and the second exhaust opening, the outer frame having an outer chamber; and an inner frame located within the outer frame, the inner frame having an inner chamber located within the outer chamber, the inner frame including:

an upper end located adjacent the top wall;

a lower end located opposite the upper end, the lower end located adjacent the bottom wall, the lower end including a second intake opening aligned with the first intake opening of the bottom wall;

a sidewall extending between the upper end and the lower end;

a first heat distribution opening formed in the sidewall of the inner frame and oriented toward the right sidewall of the outer frame; and a second heat distribution opening formed in the sidewall of the inner frame and oriented toward the left sidewall of the outer frame, wherein the first heat distribution opening is smaller than the second heat distribution opening.

20. The heat diffuser of claim 19, wherein the second intake opening is configured to receive a flow of heat generated by and emitted from the burn pot, the flow of heat to pass through the second intake opening into the inner chamber, wherein the first heat distribution opening is configured to distribute a first portion of the flow of heat from the inner chamber into the outer chamber in a first direction oriented toward the first exhaust opening, and wherein the second heat distribution opening is configured to distribute a second portion of the flow of heat from the inner chamber into the outer chamber in a second direction oriented toward the second exhaust opening.

* * * * *